(12) United States Patent
Iwata et al.

(10) Patent No.: US 7,569,970 B2
(45) Date of Patent: Aug. 4, 2009

(54) ELECTRIC MOTOR WITH MULTIPLE ROTORS IN A CONCENTRICALLY CIRCULAR ARRANGEMENT AROUND A ROTATION AXIS OF THE ELECTRIC MOTOR

(75) Inventors: Kazuyuki Iwata, Utsunomiya (JP); Masato Fujioka, Kawachi-gun (JP); Toshitaka Imai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 11/713,723

(22) Filed: Mar. 5, 2007

(65) Prior Publication Data

US 2007/0205684 A1 Sep. 6, 2007

(30) Foreign Application Priority Data

Mar. 6, 2006 (JP) ............................. 2006-060068
Sep. 22, 2006 (JP) ............................. 2006-257302

(51) Int. Cl.
*H02K 16/02* (2006.01)
(52) U.S. Cl. ....................................... 310/266; 310/114
(58) Field of Classification Search ................ 310/266, 310/112, 114, 261, 268, 190, 191, 209
See application file for complete search history.

(56) References Cited

U.S. PATENT DOCUMENTS 6,049,152 A * 4/2000 Nakano ....................... 310/114
6,304,017 B1 * 10/2001 Leupold ...................... 310/115
6,639,337 B1 * 10/2003 Nakano ....................... 310/113
6,700,242 B2 * 3/2004 Kawamura ................. 310/68 R
6,710,492 B2 * 3/2004 Minagawa ................... 310/113
6,930,423 B2 * 8/2005 Kitazawa .................... 310/168
6,992,419 B2 * 1/2006 Kim et al. ................... 310/266
6,998,757 B2 * 2/2006 Seguchi et al. .............. 310/266

FOREIGN PATENT DOCUMENTS

JP  2002-204541  7/2002

* cited by examiner

*Primary Examiner*—Michael C Zarroli
(74) *Attorney, Agent, or Firm*—Arent Fox LLP.

(57) ABSTRACT

An electric motor comprising an inner periphery side rotor provided with inner peripheral permanent magnets with unlike poles, which are disposed alternately along a circumferential direction of the inner periphery side rotor, an outer periphery side rotor provided with outer peripheral permanent magnets with unlike poles, which are disposed alternately along a circumferential direction of the outer periphery side rotor, and a rotating device that varies a relative phase between the inner periphery side rotor and the outer periphery side rotor by rotating at least the inner periphery side rotor or the outer periphery side rotor around the rotational axis. The outer peripheral side rotor is arranged such that a rotational axis thereof is coaxial with a rotational axis of the inner periphery side rotor. The rotating device sets a variable width of the relative phase between the inner periphery side rotor and the outer periphery side rotor within a range of an electrical angle of below 180°.

9 Claims, 20 Drawing Sheets

ELECTRIC MOTOR WITH MULTIPLE ROTORS IN A CONCENTRICALLY CIRCULAR ARRANGEMENT AROUND A ROTATION AXIS OF THE ELECTRIC MOTOR

Priority is claimed on Japanese Patent Application No. 2006-060068, filed Mar. 6, 2006, and Japanese Patent Application No. 2006-257302, filed Sep. 22, 2006, the contents of which are incorporated herein by reference.

BACKGROUND OF THE INVENTION

1. Field of the Invention

The present invention relates to an electric motor.

2. Description of the Related Art

Conventional electric motors, which are provided with a first rotor and a second rotor in a concentrically circular arrangement around a rotational axis of the electric motor and which control the phase difference, that is, the relative positions in the circumferential direction of the first rotor and the second rotor in response to the rotational speed of the electric motor, or in response to the speed of rotating magnetic field generated in the stator, are well known (for instance, refer to Japanese Unexamined Patent Application, First Publication No. 2002-204541).

For instance, to control the phase difference of the first rotor and the second rotor in response to the rotational speed of the electric motor, the relative positions in the circumferential direction of the first rotor and the second rotor are changed in this electric motor through members that displace along the radial direction under the action of centrifugal force. For example, to control the phase difference of the first and the second rotors in response to the speed of the rotating magnetic field generated in the stator, a control current is passed through the stator coil with the rotational speed maintained by the inertia of each rotor, and the speed of the rotating magnetic field is changed so as to change the relative positions in the circumferential direction of the first and second rotors.

Incidentally, return springs are used to restore the relative positions of the first and second rotors to their home positions in the electric motor according to one of the instances of the prior art mentioned above. This results in the problem of increasing the number of parts and the cost thereof.

The present invention was made in view of above circumstances and has an object of providing an electric motor which can reduce the cost thereof by reducing the number of parts.

SUMMARY OF THE INVENTION

The present invention employed the followings in order to achieve the above mentioned object.

That is, an electric motor including: an inner periphery side rotor provided with inner peripheral permanent magnets with unlike poles, which are disposed alternately along a circumferential direction; an outer periphery side rotor provided with outer peripheral permanent magnets with unlike poles, which are disposed alternately along a circumferential direction, the outer periphery side rotor being arranged such that a rotational axis thereof is coaxial with a rotational axis of the inner periphery side rotor; and a rotating device that varies a relative phase between the inner periphery side rotor and the outer periphery side rotor by rotating at least the inner periphery side rotor or the outer periphery side rotor around the rotational axis, and sets a variable width of the relative phase between the inner periphery side rotor and the outer periphery side rotor within a range of an electrical angle of below 180°.

According to the electric motor mentioned above, by disposing permanent magnets in the circumferential direction in the inner periphery side rotor and the outer periphery side rotor, for example, the flux linkage amount of the magnetic flux from the permanent magnets of the outer periphery side rotor linking the stator coils, can be efficiently increased or decreased by the magnetic flux from the permanent magnets of the inner periphery side rotor. In the strong magnetic field state, the torque constant (that is, torque/phase current) of the electric motor can be set at a relatively high value. The maximum torque value output by the electric motor can be increased without reducing the current loss during electric motor operation or without changing the maximum value of the inverter output current that controls the current to the stator coil.

Moreover, since the variable width of relative phase between the inner periphery side rotor and the outer periphery side rotor is set by the rotating device within the range of electrical angles of up to 180°, for instance, when the relative phase is varied taking the position of the strongest magnetic field state as the home position, a relative torque that returns it always to the home position by magnetic force can be generated without the relative torque of the weakest field becoming zero. Consequently, there is no need to use a return spring to restore the relative position to the home position, the number of parts can be reduced, and thus the cost can be reduced.

It may be arranged such that the rotating device: includes a first member integrally and rotatably provided to the outer periphery side rotor, and a second member integrally and rotatably provided to the inner periphery side rotor which together with the first member defines a pressure chamber on the inside of the inner periphery side rotor, and varies the relative phase between the inner periphery side rotor and the outer periphery side rotor by supplying a hydraulic fluid to the pressure chamber.

In this case, since the rotating device supplies hydraulic fluid to the pressure chamber defined on the inside of the inner periphery side rotor by the first member integrally and rotatably installed with respect to the outer periphery side rotor, and by the second member integrally and rotatably installed with respect to the inner periphery side rotor, it varies the relative phase between the inner periphery side rotor and the outer periphery side rotor. Thus, the induced voltage constant can be varied easily and accurately at the desired timing while inhibiting complexity of the electric motor. The result is that the range of operable rotational speed and the torque range is expanded, the operating efficiency is enhanced, and at the same time, the operable range at high efficiency can also be expanded.

Furthermore, the relative phase between the inner periphery side rotor and the outer periphery side rotor can be set to the desired phase by controlling the amount of hydraulic fluid supplied to the pressure chamber.

The variable width of the relative phase between the inner periphery side rotor and the outer periphery side rotor may be set within a range of an electrical angle of below 180° by mechanically restricting the variable width of the relative phase of the second member in relation to the first member.

Also, since the first member and the second member define the pressure chamber on the inside of the inner periphery side rotor, the increase in thickness particularly in the direction of the rotational axis can be inhibited, and the electric motor can be made compact.

The variable width of the relative phase between the inner periphery side rotor and the outer periphery side rotor may be set within a range of an electrical angle of below 180° by restricting the variable width of the relative phase of the second member in relation to the first member with a hydraulic fluid supplied to the pressure chamber.

In this case, the variable width of the relative phase between the inner periphery side rotor and the outer periphery side rotor can be set in the range of electrical angles below 180° by mechanically restricting the variable width of the relative phase for the first member of the second member. Therefore, complex phase controls and so on, are not required. Thus, the configuration can be simplified.

The variable width of the relative phase between the inner periphery side rotor and the outer periphery side rotor may be set within a range of an electrical angle of below 180° by mechanically restricting the variable width of the relative phase of the second member in relation to the first member.

In this case, the variable width of the relative phase between the inner periphery side rotor and the outer periphery side rotor can be set in the range of electrical angles below 180° by mechanically restricting the variable width of the relative phase for the first member of the second member by hydraulic fluid supplied to the pressure chamber. Therefore, dissonant contact noise is not generated. Consequently, the electric motor is extremely silent.

The variable width of the relative phase between the inner periphery side rotor and the outer periphery side rotor may be set within a range of an electrical angle of below 180° by restricting the variable width of the relative phase of the second member in relation to the first member with a hydraulic fluid supplied to the pressure chamber.

In this case, if hydraulic fluid is supplied to the pressure chamber defined in the groove of the housing, which is the second member, and the blades of the vane rotor, which is the first member, the relative phase between the housing and the vane rotor in the direction of expansion of the pressure chamber can be changed. The result is that the relative phase between the inner periphery side rotor integrally installed on the outside of the housing, and the outer periphery side rotor integrally installed in the vane rotor is changed. In this way, a simple vane actuator with vane rotor and housing is used as the rotating device; therefore, the induced voltage constant can be varied easily and accurately at the desired timing while properly inhibiting complexity of the electric motor.

It may be arranged such that: the first member is a drive plate integrally provided to a rotating shaft and the outer periphery side rotor so as to cover two end faces of the inner periphery side rotor and the outer periphery side rotor, which transmits a rotating force to the rotating shaft; and the second member is a ring gear disposed between the inner periphery side rotor and the rotating shaft, and is connected to the inner periphery side rotor and the rotating shaft by helical salines, which together with the drive plate, defines the pressure chamber, and which moves in the axial direction to supply a hydraulic oil to the pressure chamber.

In this case, when hydraulic fluid is supplied to the pressure chamber formed by the drive plate, which is the first member, and the ring gear, which is the second member, the ring gear moves relatively in the axial direction with respect to the drive plate and the outer periphery side rotor installed integrally with the drive plate. However, the ring gear is disposed between the drive plate, the integrally-installed drive shaft and inner periphery side rotor, and is connected to the rotating shaft and the inner periphery side rotor by helical salines. Thus, the relative phase between the inner periphery side rotor, rotating shaft, drive plate, and outer periphery side rotor can be changed by a shift in the axial direction. In this way, a simple actuator is used as the rotating device to move the ring gear with helical salines in the axial direction. Thus, the induced voltage constant can be easily and accurately varied at the desired timing while properly inhibiting complexity of the electric motor.

It may be arranged such that: the first member is a housing integrally provided to the outer periphery side rotor and a rotating shaft that transmits the drive force of the outer periphery side rotor; and the second member is a piston inserted in a hole formed in the housing, which together with the hole, defines the pressure chamber, and is in contact with a wall face of the inner periphery side rotor.

In this case, if the hydraulic fluid is supplied to the pressure chamber formed by the first member, which is the housing, and by the second member, which is the piston, the protrusion of the piston from the pressure chamber is increased. The result is that the relative phase between the inner periphery side rotor brings the piston in contact with the wall face, the integrally installed housing, the outer periphery side rotor, and the rotating shaft is changed. In this way, a simple vane actuator with piston is used as the rotating device; therefore, the induced voltage constant can be varied easily and accurately at the desired timing while properly inhibiting complexity of the electric motor.

The rotating device may set the positions at which the unlike poles of the outer peripheral permanent magnet and the inner peripheral permanent magnet facing each other at the home positions of the outer periphery side rotor and the inner periphery side rotor, and varies the relative phase between the inner periphery side rotor and the outer periphery side rotor from the home positions in the range of electrical angles of below 180°.

In this case, the positions at which the unlike poles of the outer peripheral permanent magnet and the inner peripheral permanent magnet face other are set at the home positions of the outer periphery side rotor and the inner periphery side rotor; therefore, by varying the relative phase between the inner periphery side rotor and the outer periphery side rotor in the range of electrical angles below 180° from the home position, a relative torque can be generated that always returns the poles to their home positions, and the relative torque at the weakest field does not reach the zero state. Consequently, there is no need to use a return spring to restore the relative position to the home position, the number of parts can be reduced, and thus the cost can be reduced.

The position at which the fluid pressure is initially supplied to the pressure chamber may be taken as a start position for phase change from the home position.

In this case, the position at which the fluid pressure is initially supplied to the pressure chamber may be taken as the start position for phase change from the home position, therefore, operation with no overshoot can be quickly performed.

DETAILED DESCRIPTION OF THE INVENTION

First Embodiment

An electric motor according to a first embodiment of the present invention will be explained below with reference to FIGS. 1 to 11B.

Figure 1:
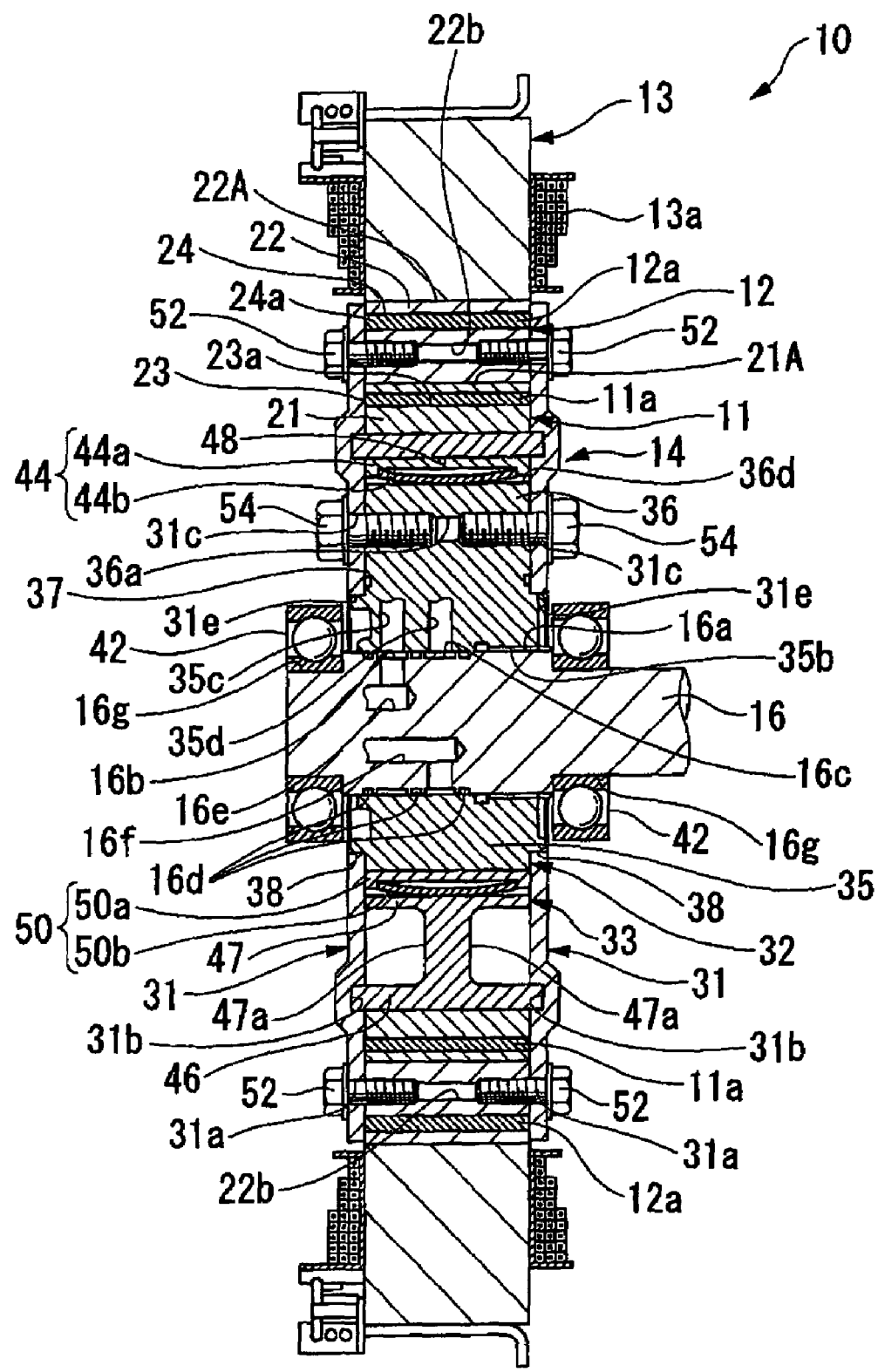
FIG. 1 is a cross-sectional view of an essential portion of an electric motor according to a first embodiment of the present invention.
Figure 2:
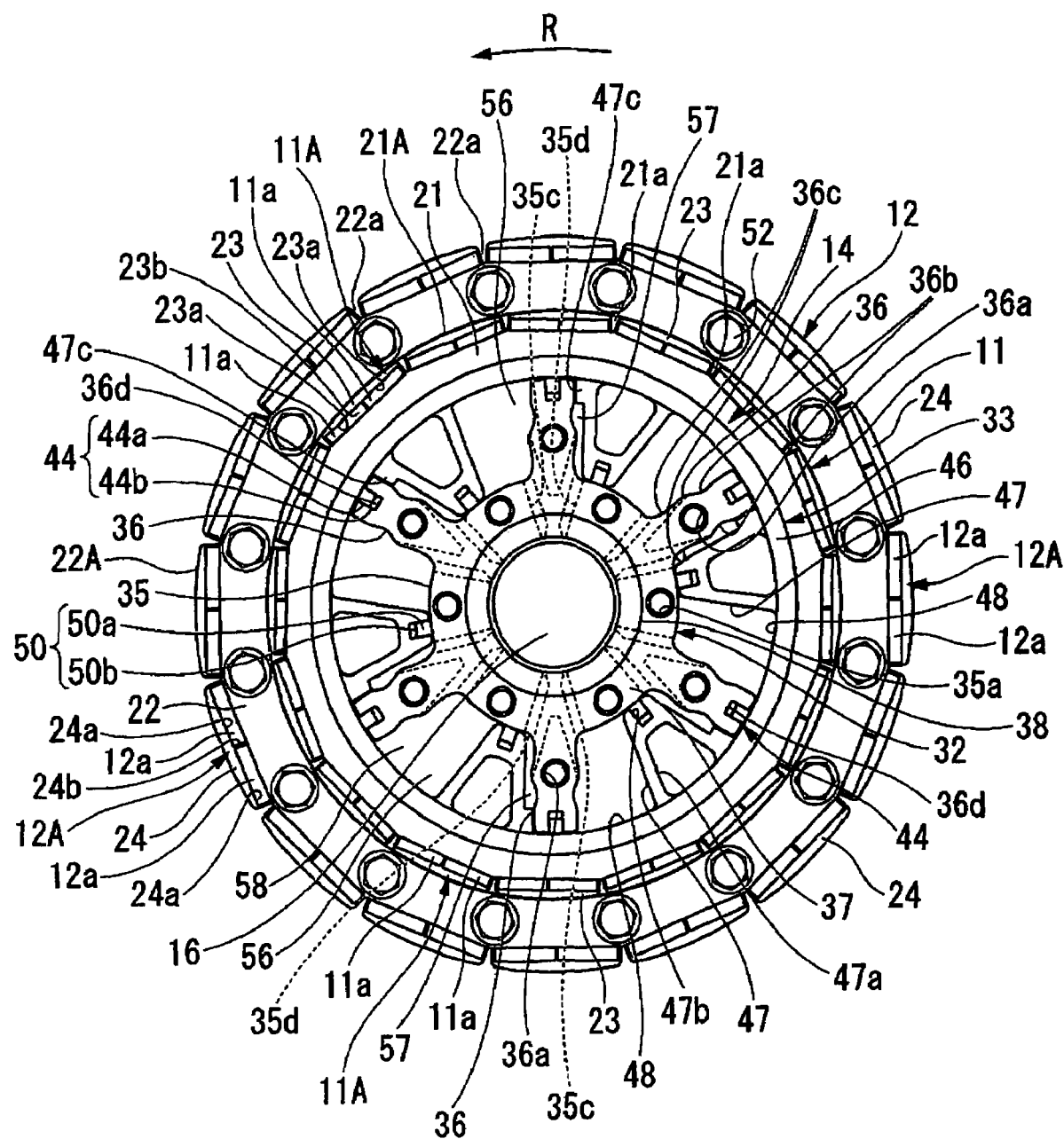
FIG. 2 is an elevation view showing an inner periphery side rotor and an outer periphery side rotor, without a drive plate in front, and showing a weak magnetic field state of a rotating mechanism of the electric motor.
Figure 3:
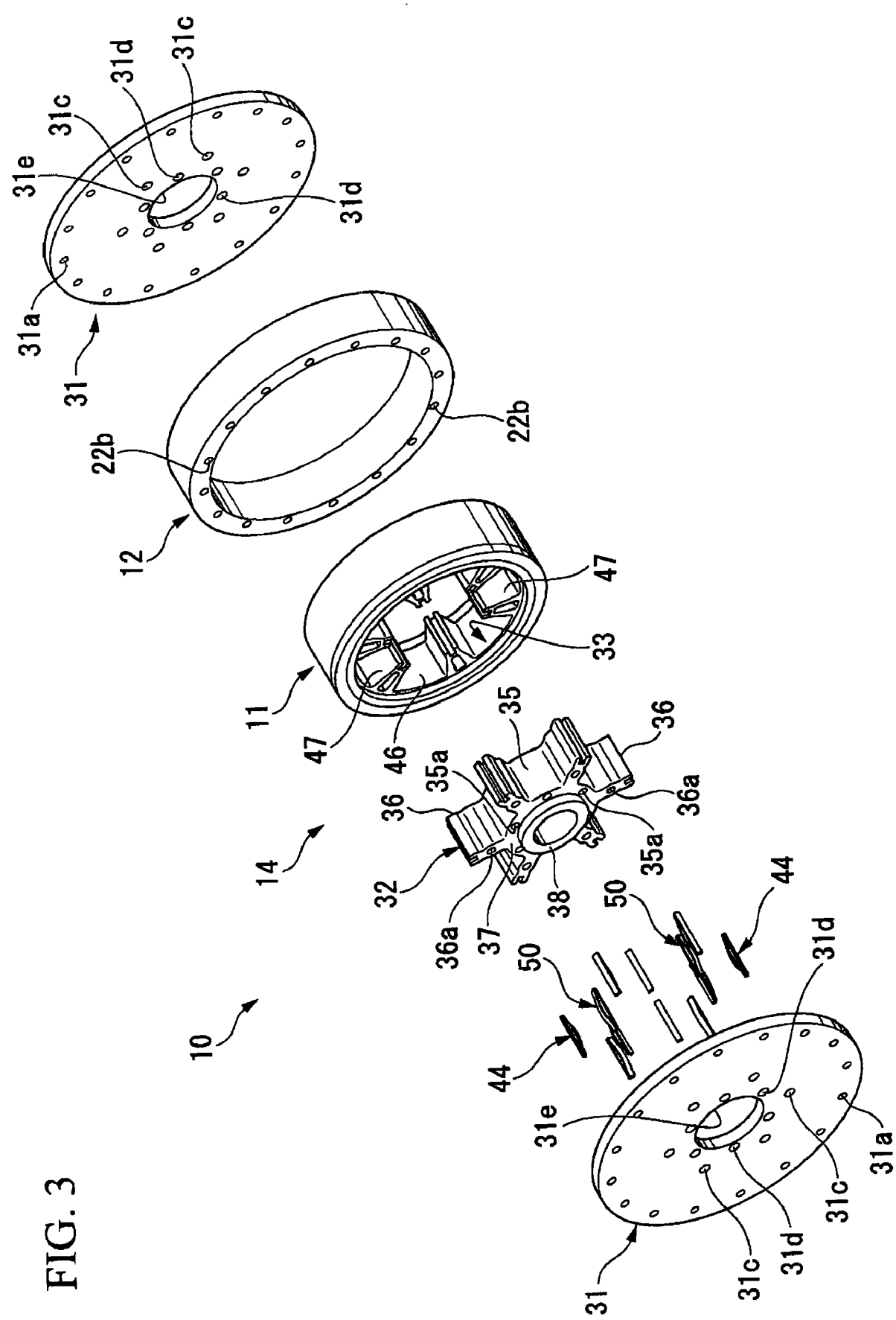
FIG. 3 is an exploded perspective view showing the inner periphery side rotor, the outer periphery side rotor, and the rotating mechanism of the electric motor.

As shown in FIGS. 1 to 3, electric motor 10 according to the present embodiment is a brushless DC motor provided with an inner periphery side rotor 11 in substantially circular shape rotatably installed to rotate with its center on the rotational axis of the electric motor 10, an outer periphery side rotor 12 in substantially circular shape rotatably installed to rotate with its center coaxial with the same rotational axis and installed radially outward with respect to the inner periphery side rotor 11 with its position aligned in the direction of the rotational axis, a stator 13 with stator coil 13a shown in FIG. 1 with multiple phases that generate rotating magnetic field which rotates the inner periphery side rotor 11 and outer periphery side rotor 12, a rotating mechanism (rotating device) 14 connected to the inner periphery side rotor 11 and outer periphery side rotor 12 that changes the relative phase between the inner periphery side rotor 11 and outer periphery side rotor 12 by the hydraulic pressure (fluid pressure) of the hydraulic oil (operating fluid), which is a non-compressible fluid, and a hydraulic control device (not shown in the figures) that controls the hydraulic pressure to the rotating mechanism 14. The electric motor 10 may be installed as the drive source in a vehicle such as a hybrid vehicle or an electric vehicle. In this case, its output shaft (rotating shaft) 16 is connected to the input shaft of the transmission unit (not shown in the figures), and the drive force of the electric motor 10 is transmitted to the drive wheels (not shown in the figures) of the vehicle through the transmission unit.

When the drive force is transmitted to the electric motor 10 from the side of the drive wheel during deceleration of the vehicle, the electric motor 10 works as a generator. That is, it generates regenerative braking force, and recovers the kinetic energy of the body as electric energy (regenerated energy). Moreover, in case of a hybrid vehicle, for instance, the rotational axis of the electric motor 10 is connected to the crankshaft of an internal combustion engine (not shown in the figures), and even when the output of the internal combustion engine is transmitted to the electric motor 10, the electric motor 10 works as a generator and generates electric energy.

The inner periphery side rotor 11 is disposed such that its rotational axis is coaxial with the rotational axis of the electric motor 10. As shown in FIG. 2, it has an inner peripheral rotor core 21 in substantially circular shape. The inner peripheral rotor core 21 is provided with multiple (specifically, at 16 locations) inner peripheral magnet mounting attachments 23, . . . , 23 at the pitch desired in the circumferential direction on the outer periphery. On the outer peripheral surface 21A of the inner peripheral rotor core 21, groove 21a extending parallel to the rotational axis is formed with a concave shape in the radial direction at all intermediate positions of the adjacent inner peripheral magnet mounting attachments 23, 23, in the circumferential direction. The inner peripheral rotor core 21 is formed by a process such as sintering.

The inner peripheral magnet mounting attachments 23, . . . 23, are provided with a pair of magnet attachment holes 23a, 23a passing through the inner peripheral rotor core 21 and parallel to the rotational axis. The pair of magnet attachment holes 23a, 23a is formed with cross sections of substantially rectangular shape for the direction parallel to the rotational axis, and they are disposed in the same plane adjacent to each other in the circumferential direction through a center rib 23b. This plane is perpendicular to the radial line joining the center rib 23b and the rotational axis. Permanent magnet 11a of substantially plate form extending parallel to the rotational axis is provided in each of the magnet attachment holes 23a, 23a.

Permanent magnets 11a mounted in each of the magnet attachment holes 23a, . . . 23a, are all similarly magnetized in the thickness direction (that is in the radial direction of rotors 11, 12). The pair of permanent magnets 11a, 11a, mounted in the pair of magnet attachment holes 23a, 23s provided in the same inner peripheral magnet mounting attachment 23 are directed such that the magnetization direction of each magnet is the same and forms a single inner peripheral permanent magnet 11A. However, one permanent magnet 11a or three or more permanent magnets 11a may be used to form one inner peripheral permanent magnet 11A. The inner peripheral magnet mounting attachments 23, 23 adjacent to each other in the circumferential direction among all the inner peripheral magnet mounting attachments 23, . . . , 23, are set such that the pairs of permanent magnets 11a, 11a mounted in one set of mounting attachments and the pairs of permanent magnets 11a, 11a mounted in the other set of mounting attachments have magnetization directions that are mutually different. That is, the inner peripheral magnet mounting attachment 23 with the pair of permanent magnets 11a, 11a having the N pole in the outer periphery is set adjacent to the inner peripheral magnet mounting attachment 23 with the pair of permanent magnets 11a, 11a having the S pole in the outer periphery in the circumferential direction through the groove 21a. That is, inner peripheral permanent magnet 11A is provided in each of the inner peripheral magnet mounting attachments 23, . . . , 23; moreover, inner peripheral permanent magnets 11A with differing polarity are disposed alternately in the circumferential direction.

The outer periphery side rotor 12 is also disposed such that its rotational axis is coaxial with the rotational axis of the electric motor 10, and has an outer peripheral rotor core 22 of substantially circular shape. Outer peripheral magnet mounting attachments 24, . . . , 24, in the same number as the inner peripheral magnet mounting attachments 23, . . . , 23, mentioned above, are provided at specific pitch in the circumferential direction in part of the outer periphery in the outer peripheral rotor core 22. On the outer peripheral surface 22A of the outer peripheral rotor core 22, a groove 22a extending parallel to the rotational axis is formed with a concave shape in the radial direction in all intermediate positions of the adjacent outer peripheral magnet mounting attachments 24, 24, in the circumferential direction. Furthermore, screw holes 22b are formed along the axial direction as shown in FIG. 1 to pass through each intermediate position of the adjacent outer peripheral magnet mounting attachments 24, . . . , 24, that is, on the inner diameter side of each of the grooves 22a, . . . , 22a of the outer peripheral rotor core 22. The outer peripheral rotor core 22 is also formed by a process such as sintering.

The outer peripheral magnet mounting attachments 24, . . . , 24, are provided with a pair of magnet attachment holes 24a, 24a that passes through them parallel to the rotational axis. The pair of magnet attachment holes 24a, 24a is formed with cross sections of substantially rectangular shape for the direction parallel to the rotational axis. These holes are disposed in the same plane adjacent to each other in the circumferential direction through a center rib 24b. This plane is perpendicular to the radial line joining the center rib 24b and the rotational axis. Permanent magnet 12a of substantially plate form extending parallel to the rotational axis is provided in each of the magnet attachment holes 24a, 24a.

Permanent magnet 12a is mounted in each of the magnet attachment holes 24a, . . . 24a, and these magnets are all magnetized in the thickness direction (that is in the radial direction of rotors 11, 12). The pair of permanent magnets 12a, 12a, mounted in the pair of magnet attachment holes 24a, 24a provided in the same outer peripheral magnet mounting attachment 24 are disposed such that the magnetization direction of each magnet is the same and forms a single outer peripheral permanent magnet 12A. However, one permanent magnet 12a or three or more permanent magnets 12a may be used to form one outer peripheral permanent magnet 12A. The outer peripheral magnet mounting attachments 24, 24 adjacent to each other in the circumferential direction among all the outer peripheral magnet mounting attachments 24, . . . , 24, are set such that the pairs of permanent magnets 12a, 12a mounted in one set of mounting attachments and the pairs of permanent magnets 12a, 12a mounted in the other set of mounting attachments have magnetization directions that are mutually different. That is, an outer peripheral magnet mounting attachment 24 wherein a pair of permanent magnets 12a, 12a is provided with outer periphery as S pole, is disposed adjacent to an outer peripheral magnet mounting attachment 24 wherein a pair of permanent magnets 12a, 12a is provided with outer periphery as N pole in the circumferential direction through the groove 22a. That is, outer peripheral permanent magnet 12A is provided in each of the outer peripheral magnet mounting attachments 24, . . . , 24; moreover, outer peripheral permanent magnets 12A are disposed alternately with differing polarity along the circumferential direction.

The inner peripheral magnet mounting attachments 23, . . . , 23 of the inner periphery side rotor 11, and the outer peripheral magnet mounting attachments 24, . . . , 24 of the outer periphery side rotor 12 are disposed such that radial directions of each of the rotors 11, 12 can be positioned opposite to each other. When positioned opposite to each other in this way, the phase of the direction of rotation of all the inner peripheral permanent magnets 11A, . . . , 11A matches that of any of the corresponding outer peripheral permanent magnet 12A with a one-to-one correspondence. In case of grooves 21a, . . . , 21a of inner periphery side rotor 11 and grooves 22a, . . . , 22a of the outer periphery side rotor 12 also, the phase of the direction of rotation of all the grooves 21a, . . . , 21a matches that of the grooves 22a with a one-to-one correspondence.

Figure 4:
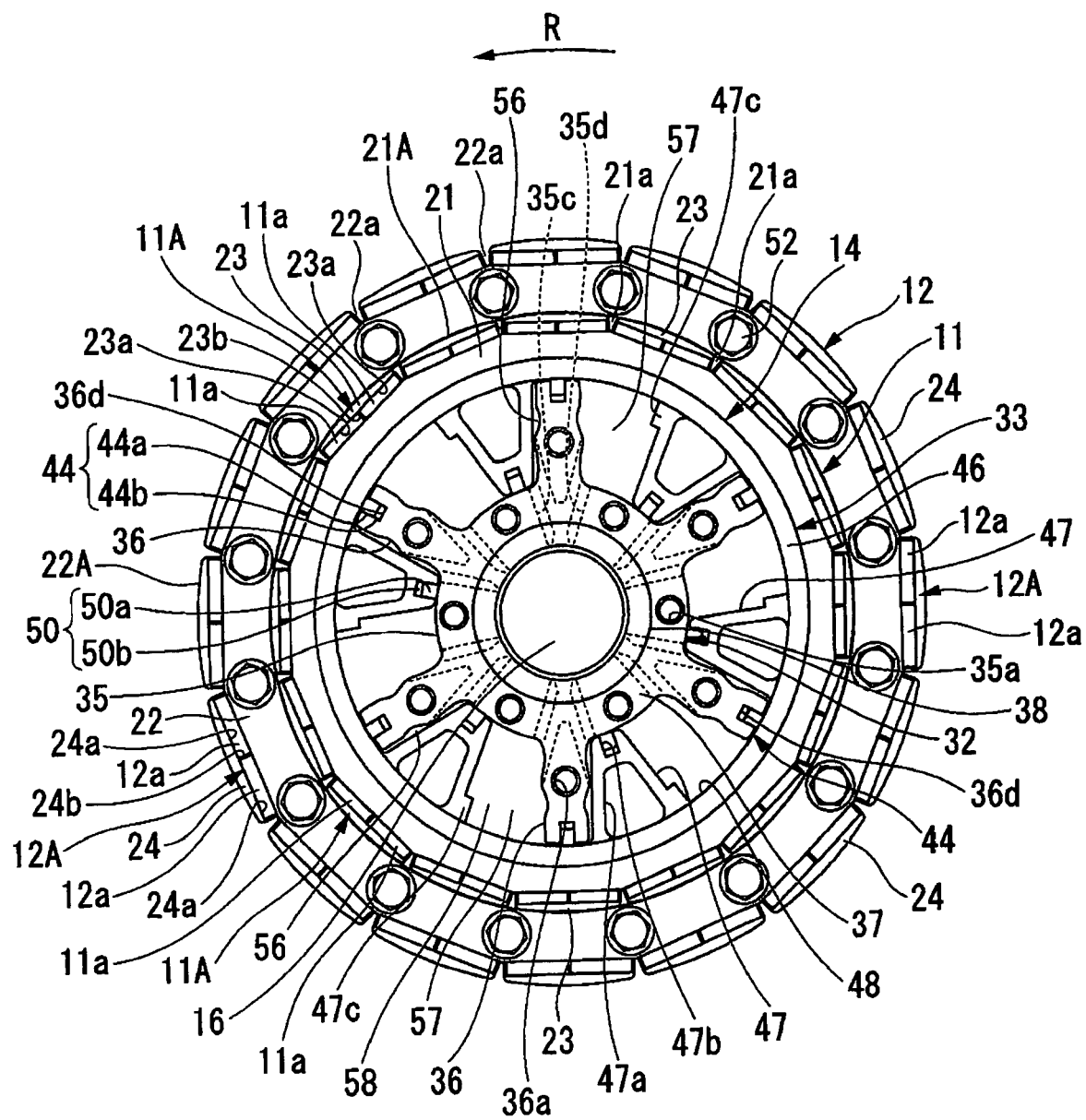
FIG. 4 is an elevation view showing an inner periphery side rotor and an outer periphery side rotor, without a drive plate in front, and showing a strong magnetic field state of a rotating mechanism of the electric motor.

Thus, depending on the relative position around the rotational axis of the inner periphery side rotor 11 and the outer periphery side rotor 12, the state of the electric motor 10 in all the inner peripheral permanent magnets 11A, . . . , 11A of the inner periphery side rotor 11 and in all the outer peripheral permanent magnets 12A, . . . , 12A of the outer periphery side rotor 12 can be changed from the weak magnetic field state shown in FIG. 2, wherein the like magnetic poles of the inner peripheral permanent magnet 11A and the outer peripheral permanent magnet 12A substantially face each other (that is, the poles of the inner peripheral permanent magnet 11A, . . . , 11A and the outer peripheral permanent magnet 12A, . . . , 12A are disposed in a substantially like-pole facing arrangement) can be set to an appropriate state extending to the strong magnetic field state shown in FIG. 4 wherein the unlike magnetic poles of the inner peripheral permanent magnet 11A, . . . 11A and the outer peripheral permanent magnet 12A, . . . , 12A face each other (that is, the poles of the inner peripheral permanent magnet 11A, . . . , 11A and the poles of the outer peripheral permanent magnet 12A, ..., 12A are disposed in an unlike-pole facing arrangement). The weak magnetic field state mentioned above is set (details given later) at a slightly stronger field state than the weakest magnetic field state when the like magnetic poles of the inner peripheral permanent magnet 11A and the outer peripheral permanent magnet 12A face each other. The strong magnetic field state mentioned above is a state where the field is strongest when the like magnetic poles of the inner peripheral permanent magnet 11A and the outer peripheral permanent magnet 12A face each other.

The stator 13 shown in FIG. 1 is formed in substantially circular shape and is disposed to face the outer periphery side rotor 12 at the circumference. For instance, it may be fixed to the housing (not shown in the figures) of the transmission unit.

Next, the rotating mechanism 14 that changes the relative phase of the inner periphery side rotor 11 and the outer periphery side rotor 12 mentioned above, is described.

As shown in FIGS. 1 and 3, the rotating mechanism 14 of the present embodiment is provided with a pair of drive plates (end plates) 31, 31 of circular shape fixed to cover the space within the outer periphery side rotor 12 on both sides of the axis of the outer periphery side rotor 12, a vane rotor (first member) 32 held between these drive plates 31, 31 and installed to integrate internally with the outer periphery side rotor 12, and a housing (second member) 33 fixed to integrate internally with the inner periphery side rotor 11 and disposed between this inner periphery side rotor 11, the vane rotor 32, the outer periphery side rotor 12, and the drive plates 31, 31. The vane rotor 32 and the housing 33 may be formed by a process such as sintering.

Multiple (same number as the number of screw holes 22b) through bolt insertion holes 31a, ... 31a, are formed in the axial direction in the outer periphery of each drive plate in the pair of drive plates with equidistant spacing on the same circumference. An annular groove 31b shown in FIG. 1 with a concave shape along the direction of the axis is formed on the side more toward the interior than the bolt insertion holes 31a, ..., 31a. Multiple through bolt insertion holes 31c, ..., 31c are formed in the drive plate 31 in the axial direction more toward the interior than the annular groove 31b and at equidistant spacing on the same circumference. Multiple through bolt insertion holes 31d, ..., 31d shown in FIG. 3, are formed at equidistant spacing on the same circumference in the axial direction more toward the interior than the bolt insertion holes 31c, ..., 31c such that the number of holes are the same as the number of bolt insertion holes 31c, ..., 31c. Inner bolt insertion holes 31d are formed at the center of adjacent bolt insertion holes 31c, 31c in the circumferential direction in all the bolt insertion holes 31c, ..., 31c. Through mating holes 31e are formed in the axial direction at the center of the drive plate 31, on the inside of the inner bolt insertion holes 31d, ..., 31d.

The vane rotor 32 is provided with a circular shaped boss 35, and multiple (same number (specifically 6) as the number of bolt insertion holes 31c mentioned above) blades 36, ... 36, extending radially outward from equidistant positions in the circumferential direction on the outer peripheral surface of the boss 35.

The boss 35 is a stepless boss with a sandwiched base section 37 of the same length in the axial direction as the blades 36, ..., 36 in the outer periphery, and a pair of mating parts 38 of circular shape protruding in the axial direction on both sides from the inner periphery of the base section 37. Multiple (the same number as the number of bolt insertion holes 31d mentioned above) through screw holes 35a in the axial direction are formed at the center of adjacent blades 36, 36 in the sandwiched base section 37. Connecting spline 35b is formed, as shown in FIG. 1, on one side in the axial direction on the inner diameter side of boss 35. On the other side, passage holes 35c, ..., 35c are formed passing through the inner periphery at the position of each blade 36, ..., 36, as shown in FIG. 2, to the same one side in the direction of rotation of the base end of the nearest blade 36, and passage holes 35d, ..., 35d are formed passing through the inner periphery at the position of each blade 36, ..., 36 to the same opposite side in the direction of rotation of the base end of the nearest blade 36. As shown in FIG. 1, the positions in the axial direction of the holes vary.

Output shaft 16 is fitted on the inner diameter side of the vane rotor 32, which transmits the drive force of the outer periphery side rotor 12. The output shaft 16 is provided with a connecting spline 16a joined to the connecting spline 35b of the boss 35, a linking groove 16b in annular shape linking all the passage holes 35c of the boss 35 in the joined condition with connecting spline 16a, inking groove 16c in annular shape linking all the passage holes 35d in the same condition, and sealing grooves 16d, 16d, 16d formed at intermediate positions and both outside positions of these linking grooves 16b and 16c. These sealing grooves 16d, 16d, 16d, are provided with sealing rings (not shown in the figures) that seal the clearances with the vane rotor 32. Passage hole 16e to supply/drain hydraulic oil for the linking groove 16b and passage hole 16f to supply/drain hydraulic oil for the linking groove 16c, are provided in the output shaft 16 so as to pass through its interior. Bearing mating parts 16g for mating with a pair of bearings 42, 42 retained in the housing of the transmission unit of a vehicle, for instance, are formed in the part of the output shaft 16 that protrudes more outward along the axial direction than the drive plates 31, 31.

The blades 36, ..., 36 are in substantially plate form. As shown in FIG. 2, through screw holes 36a are formed in the axial direction at intermediate positions in these blades. On both side surfaces of each blade in the circumferential direction, a pair of concave-shaped parts 36b, 36b is formed on the outer periphery more outward of the positions of the screw holes 36a to extend throughout the length in the axial direction. Concave-shaped parts 36c, 36c, which are inward of the positions of the screw holes 36a, are formed to extend throughout the length of the blade along the axial direction. A concave-shaped seal retaining groove 36d is formed on the outer peripheral surface of each blade 36, ..., 36, throughout the length of the blade in the axial direction from the outer peripheral surface toward the center. A spring seal 44 for sealing the clearance with the housing 33 is disposed in each of these seal retaining grooves 36d, ..., 36d. Each of these spring seals 44, ..., 44 is provided with a seal 44a provided on the outside in sliding contact with the housing 33, and a spring 44b provided on the inside that presses against the housing 33 in the radially outward direction.

The housing 33 mated and integrated with the inner periphery side rotor 11 so as to form a specific internal relationship with it, is provided with a thin circular shaped base section 46, and protruding sections 47, ..., 47 with the same number as the number of blades 36, which protrude radially inward from equidistant positions in the circumferential direction from the inner peripheral surface of the base section 46. The base section 46 protrudes in the axial direction on both sides from the protruding section 47, as shown in FIG. 1. Each protruding section 47, ..., 47, forms a substantial isosceles triangle that converges when viewed in the axial direction, as shown in FIG. 2. Grooves 48 are formed in which blades 36 of the above mentioned vane rotor 32 can be disposed in each space of the adjacent protruding sections 47, 47, in the circumferential direction in all the protruding sections 47, . . . 47. A pair of lightening holes 47a, 47a of specific concave shape of the same depth is formed on each of the protruding sections 47, . . . , 47 from both surfaces in the axial direction. The concave-shaped seal retaining groove 47b is formed on the inside end face of each extending throughout the length in the axial direction directed toward the outside diameter side. Spring seals 50 are disposed in these seal retaining grooves 47b, . . . , 47b for sealing the clearance in the outer peripheral surface of the boss 35 of the vane rotor 32. Each spring seal 50, . . . , 50 is provided with a seal 50a in sliding contact with the boss 35 of the vane rotor 32 installed on the inner periphery, and a seal spring 50b provided on the outside diameter side that presses the seal 50a against the vane rotor 32.

Stopper 47c that protrudes in the circumferential direction is formed in the base end part on the same side in the direction of rotation of each of the protruding sections 47, . . . , 47 of housing 33. The above mentioned housing 33 may be connected and integrated with the inner periphery side rotor 11 by bolts, for instance, instead of press-fitting.

When assembling the above mentioned parts, bolts 52 may be inserted in the bolt insertion holes 31a, . . . , 31a of one of the drive plates 31 with the outer periphery side rotor 12 fitted to this drive plate 31, and each of the bolts 52, . . . , 52 screwed in the screw hole 22b of the outer periphery side rotor 12. With the vane rotor 32 and the drive plate 31 in the assembled condition after mating one of the mating parts 38 in the mating hole 31e, bolts (not shown in the figures) are inserted in each of the bolt insertion holes 31d, . . . , 31d of this drive plate 31, and each bolt is screwed in the screw hole 35a of the boss 35 of the vane rotor 32. Furthermore, bolts 54 are inserted in each of the bolt insertion holes 31c, . . . , 31c of the drive plate 31, and each of the bolts 54, . . . , 54 is screwed in the screw hole 36a of the blade 36 of the vane rotor 32. Subsequently, with spring seals 44 fitted to each of the blades 36, . . . 36 of the vane rotor 32, each of the blades 36, . . . , 36 is inserted in its corresponding groove 48 in a one-to-one correspondence. The inner periphery side rotor 11 with the housing 33 press-fitted inside it beforehand, is inserted with the spring seals 50, . . . , 50 in the fitted condition.

The other drive plate 31 is aligned on the opposite side by engaging the other mating part 38 of the vane rotor 32 with the mating hole 31e. Bolts 52 are inserted in each of these bolt insertion holes 31a, . . . , 31a of the drive plate 31, and each of these bolts 52, . . . , 52 is screwed in the screw hole 22b of the outer periphery side rotor 12. Bolts (not shown in the figures) are inserted in each of the bolt insertion holes 31d, . . . , 31d of the drive plate 31. Each bolt is screwed in the screw hole 35a of the boss 35 of the vane rotor 32. Furthermore, bolts 54 are inserted in each of the bolt insertion holes 31c, . . . , 31c, and each of the bolts 54, . . . , 54 is screwed in the screw hole 36a of the blade 36 of the vane rotor 32. The result is that drive plates 31, 31 secured to both end faces of the outer periphery side rotor 12 in the axial direction, are each secured and integrated with blades 36, . . . , 36 of the vane rotor 32 by the bolts 54, . . . , 54, and secured and integrated with the boss 35 by bolts (not shown in the figures). The number of bolts 54, . . . , 54, securing the blades 36, . . . , 36 to the drive plate 31 is less than the number of bolts 52, . . . , 52 securing the drive plate 31 to the outer periphery side rotor 12, and the size of the bolts used is also larger.

Subsequently, the output shaft 16 is engaged with the inside of the vane rotor 32 by joining the connecting spline 16a and the connecting spline 35b. The result is that the output shaft 16 is secured and integrated with the vane rotor 32. Naturally, the assembly procedure described above is only an example; different procedures may be used to perform the same assembly.

According to the procedure described above, the inner periphery side rotor 11 integrated with the housing 33 is installed in space 58 between the drive plates 31, 31 on the inside of the outer periphery side rotor 12 and on the outside of the vane rotor 32, and is rotatably held in parts on both sides in the axial direction of the base section 46 inserted in the annular grooves 31b, 31b of the drive plates 31, 31. Moreover, the blades 36 of the vane rotor 32 are disposed one each in the grooves 48, . . . , 48 of the housing 33. The output shaft 16 connected by spline to the vane rotor 32 can be rotatably integrated with the outer periphery side rotor 12, the drive plates 31, 31, and the vane rotor 32. More specifically, it is fixed as an integral part.

When the outer peripheral permanent magnets 12A, . . . , 12A of the outer periphery side rotor 12 and the inner peripheral permanent magnets 11A, . . . , 11A of the inner periphery side rotor 11 have unlike poles facing each other to generate a strong magnetic field state, as shown in FIG. 4, all the vane wheels 36, . . . 36, are in contact with the adjacent protruding sections 47 on the same one side in the direction of rotation in the corresponding grooves 48. A first pressure chamber 56 is formed between the protruding sections 47 in contact, and a second pressure chamber 57 is formed wider than the first pressure chamber 56 between the adjacent protruding sections 47 on the same opposite side in the direction of rotation (that is, the first pressure chamber 56, . . . , 56 and the second pressure chamber 57, . . . , 57 are formed by the vane wheels 36, . . . , 36 accommodated in the grooves 48, . . . , 48 and the grooves 48, . . . , 48). The result is that the first pressure chambers 56, . . . 56, and the second pressure chambers 57, . . . 57, are defined on the inside of the inner periphery side rotor 11.

Conversely, when the outer peripheral permanent magnets 12A, . . . , 12A of the outer periphery side rotor 12 and the inner peripheral permanent magnets 11A, . . . , 11A of the inner periphery side rotor 11 have like poles substantially facing each other to generate a weak magnetic field state, as shown in FIG. 2, all the vane wheels 36, . . . 36, are in contact with the stoppers 47c of the adjacent protruding sections 47 on the side opposite to the side mentioned above in the direction of rotation in the corresponding grooves 48, thereby reducing the size of the second pressure chamber 57, and expanding the size of the first pressure chamber 56 between the adjacent protruding sections 47 on the side mentioned above in the direction of rotation. Passage holes 35c, . . . , 35c of the vane rotor 32 are provided in the first pressure chambers 56, . . . , 56, such that the holes always remain open with a one-to-one correspondence. Also, passage holes 35d, . . . , 35d of the vane rotor 32 are provided in the second pressure chambers 57, . . . , 57, such that the holes always remain open with a one-to-one correspondence.

The positions of strong field shown in FIG. 4, in the outer periphery side rotor 12 and in the inner periphery side rotor 11 when the unlike poles of the outer peripheral permanent magnets 12A, . . . , 12A and the inner peripheral permanent magnets 11A, . . . , 11A face each other so as to attract each other, are set to their home positions when the first pressure chambers 56, . . . , 56 and the second pressure chambers 57, . . . , 57 do not substantially receive hydraulic pressure. Even if hydraulic pressure is not received, the first pressure chamber 56, . . . , 56 and the second pressure chamber 57, . . . , 57 are full of hydraulic oil. When hydraulic oil is supplied (that is, when hydraulic pressure is supplied to the first pressure chamber 56, . . . , 56) through the passage holes 35c, ..., 35c to the first pressure chambers 56, ..., 56 from the home position state, and simultaneously, when hydraulic oil is discharged from the second pressure chambers 57, ..., 57 through the passage holes 35d, ..., 35d, the outer periphery side rotor 12 and the inner periphery side rotor 11 rotate relatively in reaction to the rotating force due to the outer peripheral permanent magnets 12A, ..., 12A, and the inner peripheral permanent magnets 11A, ..., 11A, the blades 36, ... 36 come in contact with the stoppers 47c, ..., 47c, and a weak magnetic field state occurs.

Conversely, from this state, if the supply of hydraulic pressure to the first pressure chambers 56, ..., 56 is suspended, the outer periphery side rotor 12 and the inner periphery side rotor 11 rotate relatively because of repulsion by the magnetic force since the like poles of the outer peripheral permanent magnets 12A, ..., 12A and inner peripheral permanent magnets 11A, ..., 11A are generally facing each other. Moreover, during this action, the rotors further rotate relatively when the unlike poles of the outer peripheral permanent magnets 12A, ..., 12A and the inner peripheral permanent magnets 11A, ..., 11A approach each other and are attracted to each other. Thus, after the return to home position, a strong magnetic field state occurs. During this relative rotation, hydraulic oil is supplied to the second pressure chambers 57, ..., 57, through the passage holes 35d, ..., 35d, and hydraulic oil is discharged from the first pressure chambers 56, ..., 56 through the passage holes 35c, ..., 35c.

Figure 5:
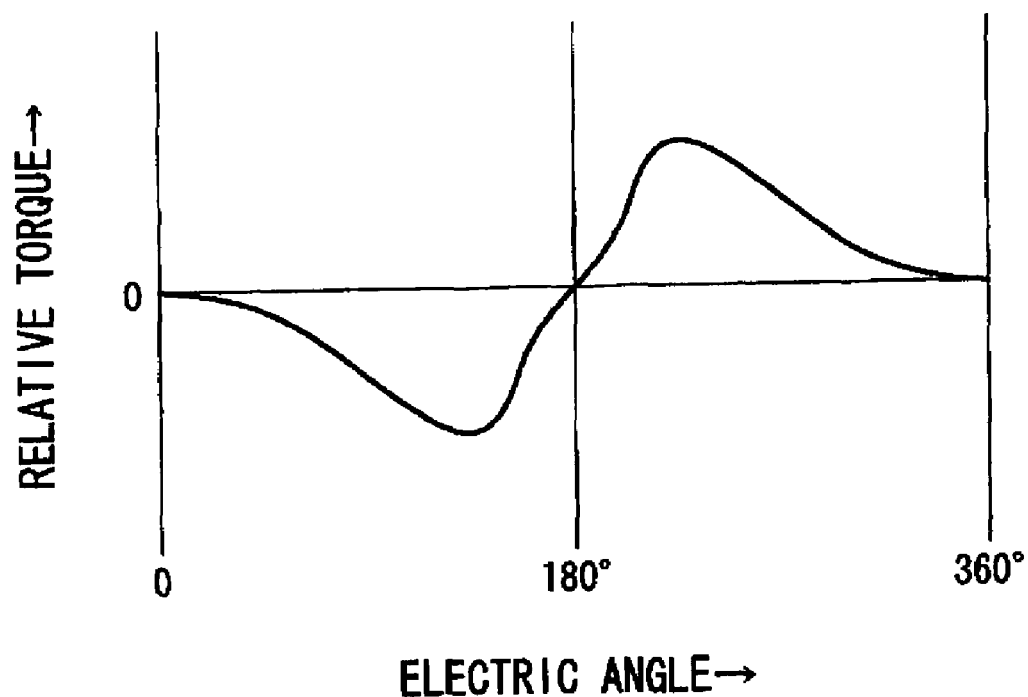
FIG. 5 is a graph showing the relationship between the electrical angle and the relative torque of the inner periphery side rotor and the outer periphery side rotor of the electric motor.

The width in the circumferential direction of the protruding section 47 including the stopper 47c of the housing 33, namely the groove 48, and the width in the circumferential direction of the blade 36 of the vane rotor 32, are set for the rotating mechanism 14 with vane rotor 32 and housing 33 according to the present embodiment such that variable width of the relative phase between the inner periphery side rotor 11 and the outer periphery side rotor 12 becomes variable on the advance angle side or the lag angle side in the range of electrical angles below 180°. That is, by mechanically restricting the variable width of the relative phase for the vane rotor 32 of the housing 33 by the width in the circumferential direction of the groove 48 of the housing 33 and the width in the circumferential direction of the blade 36 of the vane rotor 32, the variable width of the relative phase between the inner periphery side rotor 11 and the outer periphery side rotor 12 is set within the range of electrical angles below 180 degrees. More specifically, settings are made to restrict rotation closer to the home position by a specific number of degrees of electrical angle only, for a home position (minimum value of electrical angle=0°) where unlike poles of the outer peripheral permanent magnets 12A, ..., 12A and inner peripheral permanent magnets 11A, ..., 11A face each other, than the position of electrical angle 180° (mechanical angle 22.5° when the home position is taken as mechanical angle of 0°) where like poles of the outer peripheral permanent magnets 12A and the inner peripheral permanent magnets 11A completely face each other. At the position of electrical angle 180°, as shown in FIG. 5, the relative torque of the inner periphery side rotor 11 and the outer periphery side rotor 12 becomes zero resulting in a stable state. When hydraulic pressure is suspended, relative rotation of the inner periphery side rotor 11 and the outer periphery side rotor 12 may not occur; therefore, such a stable state may not occur, and the relative rotation on the weak field side may stop mechanically in the state when relative torque occurs.

The electric motor 10 matches the direction of rotation when the inner periphery side rotor 11 returns the outer peripheral permanent magnets 12A, ..., 12A for the outer periphery side rotor and the inner peripheral permanent magnets 11A, ..., 11A with like poles substantially facing each other in the weak field strength to the home position, with the direction of moment of inertia that occurs when rotation decelerates. That is, the electric motor 10 has been set such that when a vehicle is running ahead, the outer periphery side rotor 12 and the inner periphery side rotor 11 rotate in the clockwise direction, as shown in FIG. 2 and FIG. 4. When the outer periphery side rotor 12 decelerates from the weak magnetic field state as shown in FIG. 2, the moment of inertia acts on the inner periphery side rotor 11, which is in the floating condition, to restore the strong magnetic field state shown in FIG. 4.

Since the hydraulic oil is incompressible, even if the changes in phase at the ends of the two limits of strong magnetic field state and weak magnetic field state are at intermediate positions between the ends of these two limits, the hydraulic control device (not shown in the figures) can stop the supply of hydraulic oil from all the first pressure chambers 56, ..., 56 and the second pressure chambers 57, ..., 57 by shutting off the on-off valves (not shown in the figures). The outer periphery side rotor 12 and the inner periphery side rotor 11 maintain the phase relationship at that time, and the phase change at any field state can be stopped.

Thus, the vane rotor 32 mentioned above, becomes integrally rotatable and integrally fixed with respect to the outer periphery side rotor 12, and can be disposed on the inside of the inner periphery side rotor 11. Furthermore, the vane rotor 32 is integrally fixed to the outer periphery side rotor 12 through the drive plates 31, 31 fixed to the outer periphery side rotor 12 so as to cover both end faces in the axial direction of the outer periphery side rotor 12 and the inner periphery side rotor 11, and is also installed integrally with the output shaft 16 that outputs the drive force of the outer periphery side rotor 12. The housing 33 mentioned above is integrally mated and becomes integrally rotatable with respect to the inner periphery side rotor 11. Its groove 48 and the vane rotor 32 define the first pressure chamber 56 and the second pressure chamber 57 on the inside of the inner periphery side rotor 11. Moreover, the relative phase of the vane rotor 32 with respect to the housing 33 is changed by controlling the supply of hydraulic oil, that is, by controlling the supply of hydraulic pressure to the first pressure chambers 56 and the second pressure chambers 57. As a result, the relative phase between the inner periphery side rotor 11 and the outer periphery side rotor 12 is changed.

Also, the drive plates 31 transmitting the drive force of the outer periphery side rotor 12 to the output shaft 16 are formed by fixing them to both end faces of the outer periphery side rotor 12 and the vane rotor 32 in the axial direction. The integrated inner periphery side rotor 11 and the housing 33 are rotatably disposed in the circumferential direction in the space 58 shown in FIG. 2, between the outer periphery side rotor 12, the vane rotor 32 and the two drive plates 31, 31. Also, the integrated unit formed by the inner periphery side rotor 11 and the housing 33, is free to rotate in the space 58 in the floating state (that is, it is not fixed to the drive plates 31, 31 and the output shaft 16).

Figure 6A:
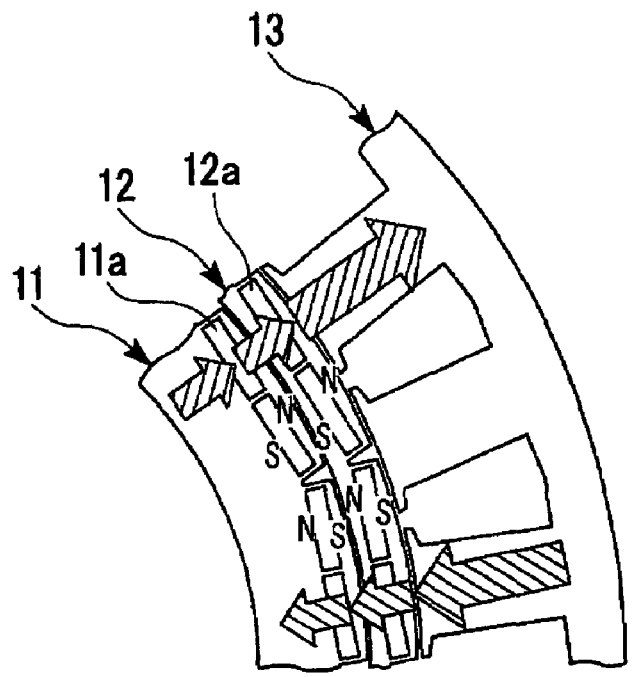
FIG. 6A schematically shows the strong magnetic field state of permanent magnets of the inner periphery side rotor and permanent magnets of the outer periphery side rotor disposed in an unlike-pole facing arrangement.
Figure 6B:
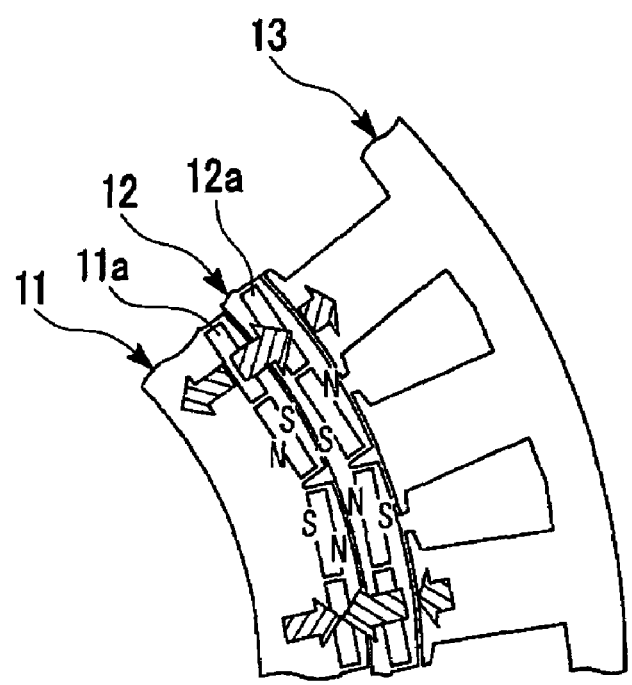
FIG. 6B schematically shows the weak magnetic field state of the poles of the permanent magnets of the inner periphery side rotor and the permanent magnets of the outer periphery side rotor disposed in a like-pole facing arrangement.
Figure 7:
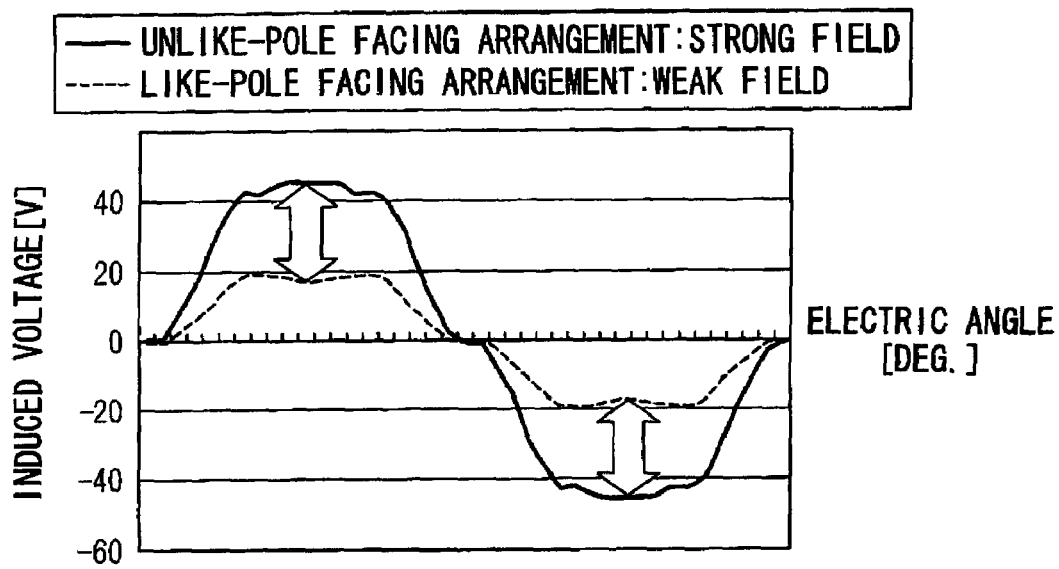
FIG. 7 is a graph showing the induced voltage in the strong magnetic field state and the weak magnetic field state shown in FIGS. 6A and 6B.

For instance, as shown in FIG. 6A, in the strong magnetic field state in the unlike-pole facing arrangement of the permanent magnet 11a of the inner periphery side rotor 11 and the permanent magnet 12a of the outer periphery side rotor 12, and for instance, as shown in FIG. 6B, in the weakest magnetic field state (this state does not occur in the present embodiment, but is assumed as an example for convenience in this explanation) in the like-pole facing arrangement of the permanent magnet 11a of the inner periphery side rotor 11 and the permanent magnet 12a of the outer periphery side rotor 12, the induced voltage constant Ke is changed by changing the state of the electric motor 10 between the strong magnetic field state and the weak magnetic field state by changing the magnitude of the induced voltage, as shown in FIG. 7.

This induced voltage constant Ke is the ratio of rotational speeds of the induced voltage induced at the coil end of the stator coil 13a by rotation of the rotors 11, 12. Moreover, Ke can be expressed by the product of number of pairs of poles p, the outside diameter of motor R, the motor lamination thickness L, the flux density B, and the number of turns T as Ke=8×p×R×L×B×T×π. By changing the state of the electric motor 10 from the strong magnetic field state to the weak magnetic field state, the magnitude of the flux density B of the magnetic flux from the permanent magnet 11a of the inner periphery side rotor 11 and the permanent magnet 12a of the outer periphery side rotor 12 can be varied, and the induced voltage constant Ke can be changed.

Figure 8A:
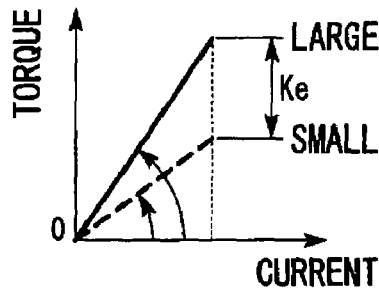
FIG. 8A is a graph showing the relationship between the electric current and the torque of the electric motor that vary in response to the induced voltage constant Ke.

For instance, as shown in FIG. 8A, the torque of the electric motor 10 is taken as being proportional to the product of the induced voltage constant Ke and the electric current passing through the stator coil 13a (torque∝(Ke×electric current)).

Figure 8B:
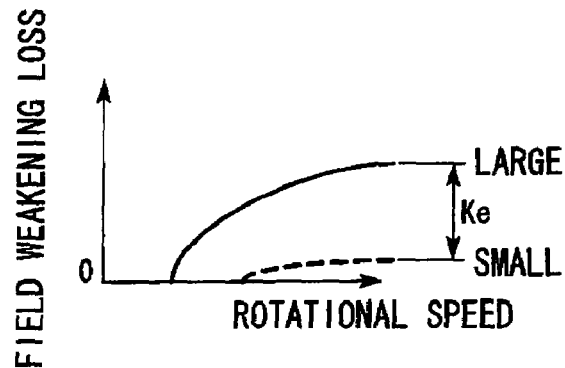
FIG. 8B is a graph showing the relationship between the rotational speed and the field weakening loss of the electric motor that vary in response to the induced voltage constant Ke.

Also, as shown in FIG. 8B, since the field weakening loss of the electric motor 10 is proportional to the product of the induced voltage constant Ke and the rotational speed (field weakening loss (Ke∝×rotational speed)), the permissible rotational speed of the electric motor 10 is inversely proportional to the product of the induced voltage constant Ke and the rotational speed (permissible rotational speed∝(1/(Ke×rotational speed))).

Figure 9:
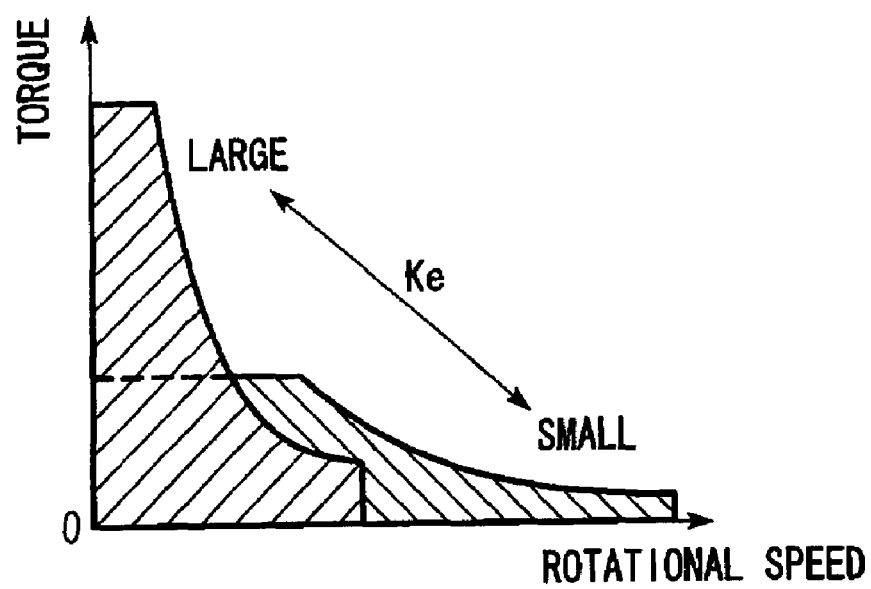
FIG. 9 shows the operable region for the rotational speed and the torque of the electric motor that varies in response to the induced voltage constant.

That is, as shown in FIG. 9, for instance, in the electric motor 10 where the induced voltage constant Ke is relatively large, although the operable rotational speed is relatively low, a relatively large torque can be output. On the other hand, in the electric motor 10 with relatively small induced voltage constant Ke, although the torque that can be output is small, the motor can be operated up to a relatively high rotational speed. Accordingly, the operable region for torque and rotational speed varies depending on the induced voltage constant Ke.

Figure 10A:
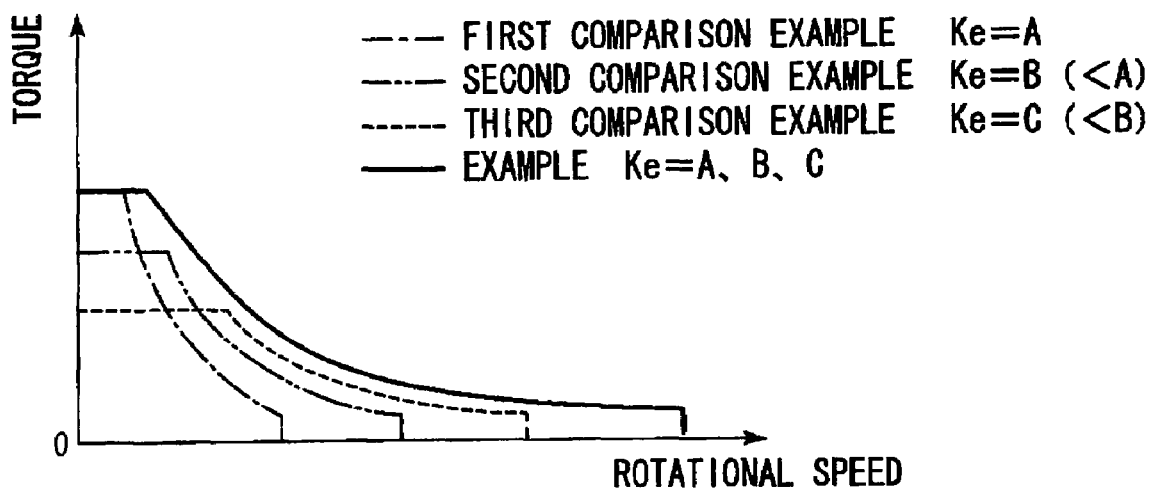
FIG. 10A is a graph showing the relationship between the electric current and the rotational speed of the electric motor that vary in response to the induced voltage constant Ke.

For this reason, for example, as in the embodiment shown in the FIG. 10A, the operable region for the torque and the rotational speed expands compared to the case when the induced voltage constant Ke is not changed (for instance, first to third comparative examples), by performing settings such that the induced voltage constant Ke changes with a decreasing trend (for instance, it changes sequentially from A, B (<A), C (<B) and so on) with the increase in the rotational speed of the electric motor 10.

Figure 10B:
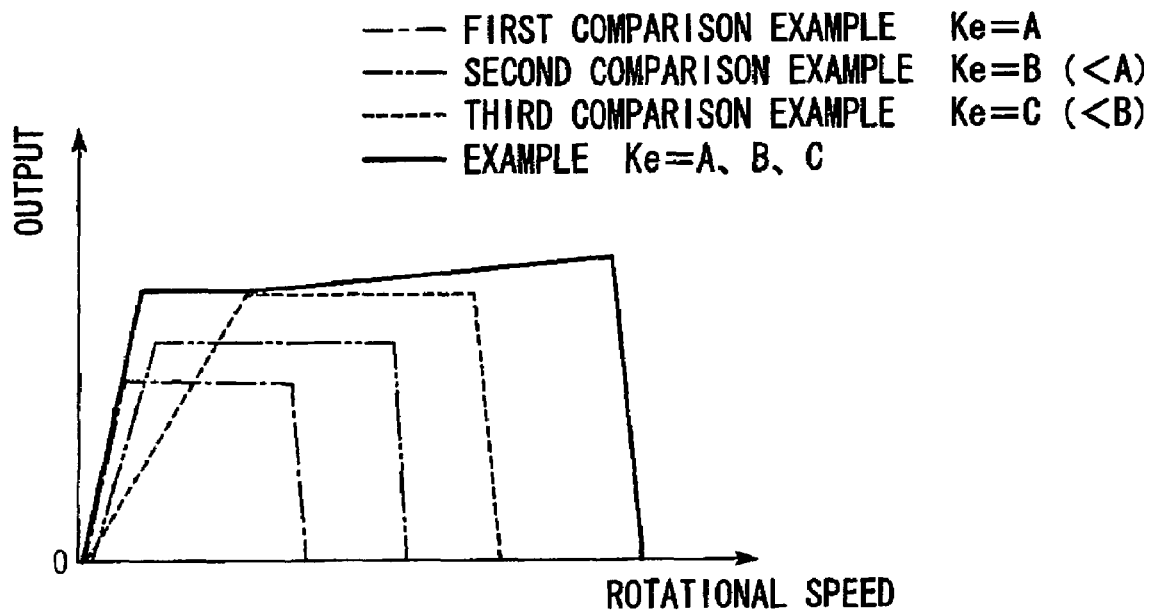
FIG. 10B is a graph showing the relationship between the rotational speed and the output of the electric motor that vary in response to the induced voltage constant Ke.

The output of the electric motor 10 is proportional to the value obtained by subtracting the field weakening loss and other losses from the product of the induced voltage constant Ke, the electric current passing through the stator coil 13a, and the rotational speed (that is output∝(Ke×electric current×rotational speed−field weakening loss−other losses)). That is, as shown in FIG. 10B, for instance, the output increases in relatively low rotational speed region in the electric motor 10 where the induced voltage constant Ke is relatively large, although the operable rotational speed is relatively low. On the other hand, the output at a relatively high rotational speed also increases in the electric motor 10 in which the induced voltage constant Ke is relatively small, although the output decreases in the relatively low rotational speed region, when the motor becomes operable up to a relatively high rotational speed. Accordingly, the operable region for output and rotational speed varies depending on the induced voltage constant Ke. For this reason, with the increase in the rotational speed of the electric motor 10, the operable region for the output and rotational speed expands compared to the case when the induced voltage constant Ke is not varied (for instance, in the first to third comparative examples) by performing settings so that the induced voltage constant Ke varies with a decreasing trend (for instance, sequentially varying from A, B(<A), C(<B) and so on).

The efficiency of the electric motor 10 is proportional to the value obtained by subtracting the copper loss, field weakening loss, and other losses from the input power for the stator coil 13a and dividing this value by the input power (that is, input power−copper loss−field weakening loss−other losses)/input power)).

For this reason, the electric current required for output of specific torque decreases by selecting a relatively large induced voltage constant Ke in the region of relatively low rotational speed to intermediate rotational speed, and thus the copper loss decreases.

In the region of intermediate rotational speed to relatively high rotational speed, the field weakening current decreases by selecting relatively low induced voltage constant Ke, and thus the field weakening loss decreases.

Figure 11A:
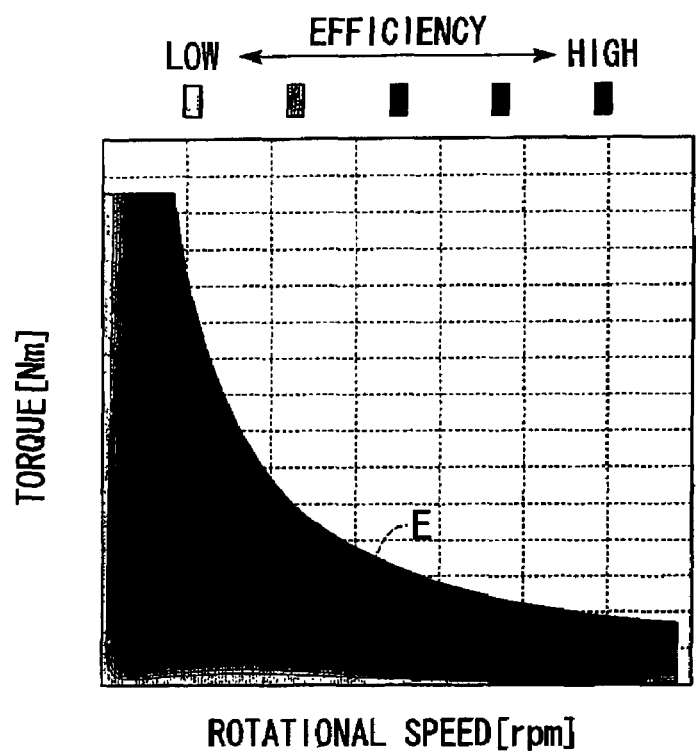
FIG. 11A shows the distribution of operable regions and efficiency for the rotational speed and the torque of the electric motor that vary in response to the induced voltage constant Ke in an example.
Figure 11B:
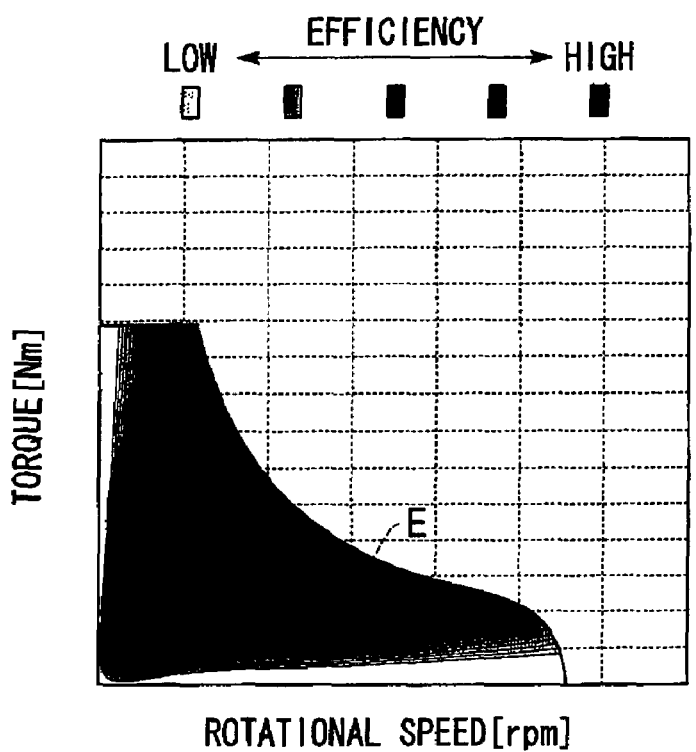
FIG. 11B shows the distribution of operable regions and the efficiency for the rotational speed and the torque of the electric motor that vary in response to the induced voltage constant Ke in a second comparative example.

As in the embodiment shown in the example in FIG. 11A, the settings are performed such that the induced voltage constant Ke changes to a decreasing trend with the increase in the rotational speed of the electric motor 10. Compared to the case when the induced voltage constant Ke is not varied (for instance, the second comparative example shown in FIG. 11B), the rotational speed and the operable region for the rotational speed both increase, and at the same time, the high efficiency region E in which the efficiency of the electric motor 10 increases above the desired efficiency, also expands. Furthermore, the maximum efficiency value that can be achieved also increases.

According to the present embodiment as mentioned above, firstly by disposing permanent magnet 11a and permanent magnet 12a in the circumferential direction in the inner periphery side rotor 11 and the outer periphery side rotor 12, for example, the flux linkage amount from the magnetic flux from the permanent magnet 12a of the outer periphery side rotor 12 linking the stator coil 13a, can be efficiently increased or decreased by the magnetic flux from the permanent magnet 11a of the inner periphery side rotor 11. In the strong magnetic field state, the torque constant (that is, torque/phase current) of the electric motor 10 can be set at a relatively high value. The maximum torque value output by the electric motor 10 can be increased without reducing the current loss during electric motor operation or without changing the maximum value of the inverter output current that controls the current to the stator coil 13a.

Moreover, since the variable width of relative phase between the inner periphery side rotor 11 and the outer periphery side rotor 12 is set by the rotating mechanism 14 within the range of electrical angles of up to 180°, when the relative phase is varied taking the position of the strongest magnetic field state as the home position, a relative torque that returns it always to the home position by magnetic force can be generated without the relative torque of the weakest field becoming zero. Consequently, there is no need to use a return spring to restore the relative position to home position, the number of parts can be reduced, and thus the cost can be reduced.

The variable width of the relative phase between the inner periphery side rotor 11 and the outer periphery side rotor 12 can be set in the range of electrical angles below 180° by mechanically restricting the variable width of the relative phase for the vane rotor 32 of the housing 33. Therefore, complex phase controls are not required, and the configuration can be simplified.

Moreover, the rotating mechanism 14 can supply/drain hydraulic oil for the first pressure chambers 56, . . . , 56 and the second pressure chambers 57, . . . , 57 defined on the inside of the inner periphery side rotor 11 by the vane rotor 32 integrally and rotatably installed with respect to the outer periphery side rotor 12 and the housing 33 integrally and rotatably installed with respect to the inner periphery side rotor 11. As a result, the relative phase between the inner periphery side rotor 11 and the outer periphery side rotor 12 can be changed, and the induced voltage constant can be varied at the desired timing easily and accurately while inhibiting complexity of the electric motor 10. The result is that the range of operable rotational speed and the torque range can be expanded, the operating efficiency enhanced, and at the same time, the operable range at high efficiency can also be expanded.

Furthermore, by restricting the amount of hydraulic oil supplied to the first pressure chambers 56, . . . , 56 and the second pressure chambers 57, . . . , 57, the relative phase between the inner periphery side rotor 11 and the outer periphery side rotor 12 can be changed steplessly in the range of electrical angles up to 180° between the strong magnetic field state and the weak magnetic field state.

Also, since the vane rotor 32 and the housing 33 define the first pressure chambers 56, . . . , 56 and the second pressure chambers 57, . . . , 57 on the inside of the inner periphery side rotor 11, the increase in thickness of the electric motor 10 particularly in the axial direction can be inhibited and the motor can be made more compact.

More specifically, if hydraulic oil is drained from the second pressure chambers 57, . . . , 57 while hydraulic oil is supplied to the first pressure chambers 56, . . . , 56, defined by the blades 36, . . . , 36 of the vane rotor 32 and the grooves 48, . . . , 48 of the housing 33, the relative phase between the housing 33 and the vane rotor 32 changes in the direction in which the first pressure chambers 56, . . . , 56 expand. The result is that the relative phase between the inner periphery side rotor 11 integrally installed on the outside of the housing 33, and the outer periphery side rotor 12 integrally installed in the vane rotor 32 changes, and a weak magnetic field state occurs. On the other hand, conversely, if hydraulic oil is drained from the first pressure chambers 56, . . . , 56 while supplying hydraulic oil to the second pressure chambers 57, . . . , 57, the relative phase between the housing 33 and the vane rotor 32 changes in the direction in which the second pressure chambers 57, . . . , 57 expand. The result is that the relative phase between the inner periphery side rotor 11 and the outer periphery side rotor 12 changes and a strong magnetic field state occurs. In this way, since the rotating mechanism 14 uses a simple vane actuator mechanism having vane rotor 32 and housing 33, the induced voltage constant can be varied easily and accurately at the desired timing while properly inhibiting complexity of the electric motor 10.

Also, the vane rotor 32 is integrally installed with the outer periphery side rotor 12 through the drive plates 31, 31 fixed to the outer periphery side rotor 12 so as to cover the end faces in the axial direction. Moreover, it is also integrally installed with the output shaft 16 that outputs the drive force of the outer periphery side rotor 12, and thus, it can transmit the rotation of the outer periphery side rotor 12 to the directly linked output shaft 16. On the other hand, the pressure of the hydraulic oil supplied to the first pressure chambers 56, . . . , 56 and the second pressure chambers 57, . . . , 57, is mainly used to change the relative phase between the housing 33 and the vane rotor 32 integrally installed on the inside of the inner periphery side rotor 11, that is, to change the relative phase between the inner periphery side rotor 11 and the outer periphery side rotor 12. Consequently, the pressure required to be generated in the hydraulic oil can be restricted to a low value.

Furthermore, since the hydraulic oil is supplied/drained from/to the first pressure chambers 56, . . . , 56, and the second pressure chambers 57, . . . , 57 through the vane rotor 32, the increase in thickness in the axial direction with the formation of flow path of the hydraulic oil can be inhibited.

Also, the first pressure chambers 56, . . . , 56 and the second pressure chambers 57, . . . , 57 are defined by the housing 33 press-fitted to the inner periphery side rotor 11. Therefore, the hydraulic oil in the first pressure chambers 56, . . . , 56 and the second pressure chambers 57, . . . , 57 take away the heat of the inner periphery side rotor 11 through the housing 33, and the rotor is cooled. Furthermore, the hydraulic oil in the first pressure chambers 56, . . . , 56 and the second pressure chambers 57, . . . , 57, moves to the outside because of the centrifugal force due to the rotation of the outer periphery side rotor 12 and the inner periphery side rotor 11. Provided that a special seal construction is not used, hydraulic oil is likely to leak to the outside from the clearances between the pair of drive plates 31, 31, housing 33, inner periphery side rotor 11, and outer periphery side rotor 12, but heat is captured from the inner periphery side rotor 11 and the outer periphery side rotor 12 when it passes through the clearances, thus resulting in cooling of the same. Moreover, the leaked hydraulic oil also cools the stator 13 when it falls mainly on the stator coil 13a of the stator 13 because of the centrifugal force.

As shown in FIG. 5, the relative torque of the inner periphery side rotor 11 and the outer periphery side rotor 12 is small in the range near the electrical angle of 0°. That is, it is preferable to offset the home position to the weak magnetic field state by an amount equivalent to that of the desired electrical angle exceeding the electrical angle of 0° from the perspective of inhibiting vibrations and noise since relative rotation may occur from an external disturbance. For instance, it is possible to install separate stoppers on the opposite side as the stoppers 47c, . . . , 47c of the protruding sections 47, 47, when the inner periphery side rotor 11 and the outer periphery side rotor 12 are on the strong field side. Moreover, the relative torque due to the magnetic force can be used to make the minimum position of the electrical angle at which the relative rotation of these can be disabled as the home position.

Second Embodiment

Next, an electric motor according to a second embodiment of the present invention will be explained below with mainly reference to FIG. 12 with the focus on the differences with the first embodiment mentioned above. In parts that are the same as those in the first embodiment, the same reference numerals are applied and their explanations are omitted.

In the present embodiment, a rotating mechanism 70 differing from the one in the first embodiment is used.

The rotating mechanism 70 of the present embodiment is provided with a pair of drive plates (first member) 71, 71, of circular shape fixed on both sides of the outer periphery side rotor 12 in the axial direction so as to cover the spaces inside the outer periphery side rotor 12, a supporting member 73 that supports an output shaft 72 of the electric motor 10 integrally installed with one of the drive plates 71, a supporting member 74 (first member, drive plate) that supports the output shaft 72 and is integrally mounted with the other drive plate 71, a rotor body at the inner periphery 75 having the same configuration as the inner periphery side rotor 11 of the first embodiment, an internal member 77 provided with an inner periphery side rotor 76 press-fitted to and integrally fixed to the inside of the rotor body at the inner periphery 75, and the rotor body at the inner periphery 75, and a ring gear (second member) 78 disposed between the internal member 77 and supporting members 73, 74.

Screw holes 22b, . . . , 22b of the first embodiment are formed in the outer periphery side rotor 12 and at the same position, bolt insertion holes 22c, . . . , 22c are also formed.

On the outer periphery of each of a pair of drive plates, 71, 71, multiple (same number as the bolt insertion hole 22c) through bolt insertion holes 71a, . . . , 71a in the axial direction are formed on the same circumference at equidistant spacing. Multiple through bolt insertion holes 71b, . . . , 71b are formed in the axial direction on the same circumference at equidistant spacing but more toward the center than the bolt insertion holes 71a, . . . , 71a. The pair of drive plates 71, 71, are fixed to the outer periphery side rotor 12 using the bolt insertion holes 71a of one of the drive plates 71 aligned with the outer periphery side rotor 12 on both sides in the axial direction, the bolt insertion hole 22c, the bolt 79 inserted in the bolt insertion hole 71a of the other drive plate 71, and the nut 80 screwed to this bolt 79.

On the other hand, the supporting member 73 is provided with a cylinder (rotating shaft) 81, and a flange (first member, drive plate) 82 that extends in disc form radially outward from one side in the axial direction of the cylinder 81. An annular step 82a is formed in step shape on the side of the cylinder 81 in the axial direction on the outer periphery of the flange 82. Multiple (the same number as the number of bolt insertion holes 71b) through screw holes 82b in the axial direction are formed on the same circumference at equidistant spacing at the position of the step 82a. A helical spline 81a is formed on the outer periphery of the cylinder 81 of the supporting member 73, and a connecting spline 81b is formed on the inner periphery. Also, multiple passage holes 81c, . . . , 81c, passing through the inner and outer periphery in the radial direction are formed at the boundary of the flange 82 of the cylinder 81 extending in radial form up to a part of the flange 82. The supporting member 73 is joined to the step 82a inside one of the drive plates 71, and in this condition, the bolts 84 are inserted in the bolt insertion holes 71b, . . . , 71b, and screwed in the screw holes 82b to fix one of the drive plates 71.

The other supporting member 74 is in circular shape, and an annular step 74a in stepped form in the axial direction is formed on its outer periphery. Multiple (the same number as the number of bolt insertion holes 71b) through screw holes 74b in the axial direction are formed on the same circumference at equidistant spacing at the position of the step 74a. Multiple half-hole shaped passage grooves 74c, . . . , 74c are formed in the supporting member 74 in radial form extending in the radial direction by grinding off a part from the inner periphery of the end face on the opposite side as the step 74a. The supporting member 74 is joined to the step 74a inside the other drive plate 71, and in this condition, the bolts 84 are inserted in the bolt insertion holes 71b, . . . , 71b, and screwed in the screw holes 84b to fix it to the other drive plate 71. The supporting member 74 is brought into contact with the front end face of the cylinder 81 of the supporting member 73 in the fitted condition.

Output shaft 72 is fitted to the electric motor 10 on the inner diameter side of the supporting member 73 and the supporting member 74. This output shaft 72 is provided with a connecting spline 72a joined to the connecting spline 81b of the supporting member 73, a linking groove 72b in annular shape that links all the passage holes 81c, . . . , 81c of the supporting member 73 in the joined condition to the supporting member 73 by the connecting spline 72a, sealing grooves 72c, 72c formed at both outside positions of the linking groove 72b, and the passage hole 72d that passes through the interior for supply/drainage of hydraulic oil for the linking groove 72b. Seals (not shown in the figures) for sealing the clearances between supporting members 73 are disposed in the sealing grooves 72c, 72c.

The output shaft 72 is provided with a linking groove 72e in annular shape that links all the passage grooves 74c, . . . , 74c of the supporting member 74 in the joined condition to the supporting member 73 by the connecting spline 72a, the sealing grooves 72f, 72f formed on both sides of the linking groove 72e, and the passage hole 72g that passes through the interior for supply/drainage of hydraulic oil for the linking groove 72e. Seals (not shown in the figures) for sealing the clearances between supporting members 74 are disposed in the sealing grooves 72f, 72f. The passage holes 72d, 72g formed in the output shaft 72 open out on opposite sides in the axial direction of the output shaft 72 with respect to each other.

Bearing mating parts 72h, 72h for mating the bearings 42 are formed on the part that protrudes from both sides in the axial direction out of the supporting member 73 and the supporting member 74 in the output shaft 72. On the other hand, gear 88 that transmits the rotating force is joined by spline in the axial direction on the inside of the bearing mating part 72h.

The internal member 77 press-fitted internally to become integral with the rotor body at the inner periphery 75 is provided with a circular shaped base section 90 with a small thickness in the radial direction, and an annular protruding section 91 protruding from an intermediate position in the axial direction toward the side of the central axis in the inner peripheral surface of the base section 90. A helical spline 91a with twist in a direction opposite to that of the helical spline 81a mentioned above, is formed on the inner peripheral surface of the annular protruding section 91.

The ring gear 78 is provided with a substrate in circular shape 93, an inner cylinder 94 that protrudes from the inner periphery of the substrate 93 on one side in the axial direction, an outer cylinder 95 that protrudes from the outer periphery of the substrate 93 on both sides in the axial direction, and an annular protruding section 96 that protrudes from the end opposite to that of the outer cylinder 95 as the inner cylinder 94 in the axial direction and protrudes circularly in the radial direction. A helical spline 94a slidably connected to the helical spline 81a of the supporting member 73 mentioned above, is formed on the inner peripheral surface of the inner cylinder 94. A helical spline 95a slidably connected to the helical spline 91a of the internal member 77 mentioned above, is formed on the outer peripheral surface of the outer cylinder 95. A centrally concave-shaped annular sealing groove 96a is formed on the outer peripheral surface of the annular protruding section 96. Seal ring (not shown in the figures) for sealing the clearance between internal members 77 is disposed in the sealing groove 96a.

A first pressure chamber 101 for supply/drainage of hydraulic oil through the passage hole 72d of the output shaft 72 and the passage holes 81c, . . . , 81c of the linking groove 72b and the supporting member 73, is formed between the ring gear 78 and the flange 82 of the supporting member 73. A second pressure chamber 102 for supply/drainage of hydraulic oil through the passage hole 72g of the output shaft 72 and the passage grooves 74c, . . . , 74c of the linking groove 72e and the supporting member 74, is formed between the ring gear 78 and the supporting member 74. The first pressure chamber 101 and the second pressure chamber 102 are defined on the inside of the inner periphery side rotor 76. The first pressure chamber 101 and the second pressure chamber 102 are filled with hydraulic oil even when they are in a state when no hydraulic pressure is received.

In the present embodiment also, the strong field position (position at electrical angle 0°) generated when the outer peripheral permanent magnets 12A, ..., 12A (refer to the first embodiment) and the inner peripheral permanent magnets 11A, ..., 11A (refer to the first embodiment) of the outer periphery side rotor 12 and the inner periphery side rotor 76 are disposed with their opposite poles facing each other so as to attract each other, is set at the home position when the first pressure chamber 101 and the second pressure chamber 102 do not receive substantial hydraulic pressure. When at this home position, the ring gear 78 is in contact with the flange 82 of the supporting member 73.

Figure 12:
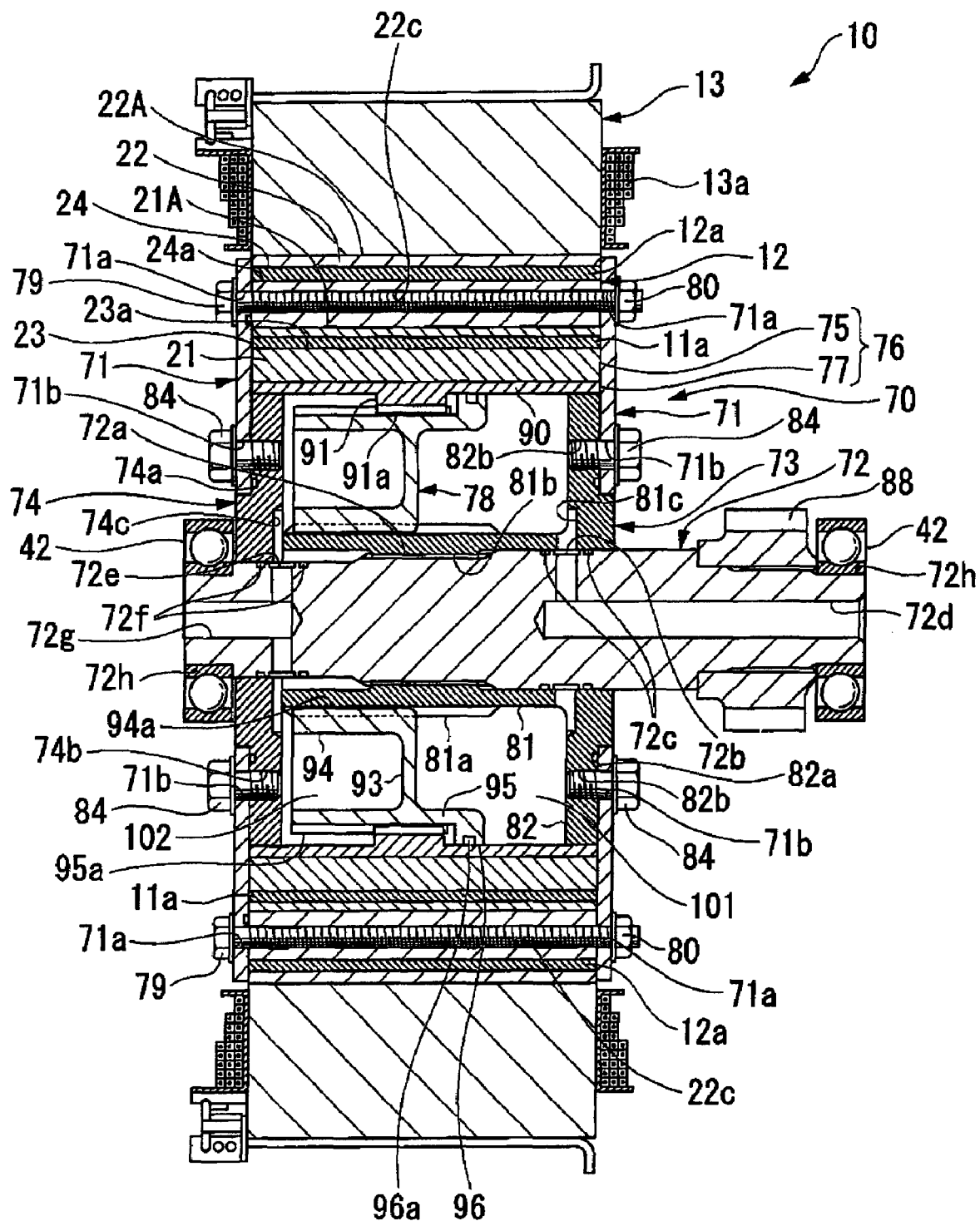
FIG. 12 is a cross-sectional view showing an inner periphery side rotor, an outer periphery side rotor, and a rotating mechanism of an electric motor in a weak magnetic field state, according to a second embodiment of the present invention.

From the state in this home position, if hydraulic oil is supplied to the first pressure chamber 101 (that is, hydraulic pressure is supplied to the first pressure chamber 101) and simultaneously, if hydraulic oil is drained from the second pressure chamber 102, the ring gear 78 shifts in the axial direction and comes into contact with the stopper (not shown in the figures) of the supporting member 74, so that the second pressure chamber 102 becomes narrow and the first pressure chamber 101 becomes wide (this condition is shown in FIG. 12). At this stage, because of the twist in the helical salines 81a, 94a meshed with each other, the ring gear 78 rotates with respect to the cylinder 81 of the supporting member 73 integrated with the outer periphery side rotor 12 and the output shaft 72. While doing so, the inner periphery side rotor 76 is rotated further in the same direction because of the twist-in the helical salines 95a, 91a which are also meshed with each other. The outer periphery side rotor 12 and the inner periphery side rotor 76 rotate relative to each other in reaction to the rotating force due to the magnetic force in the outer peripheral permanent magnets 12A, ..., 12A and the inner peripheral permanent magnets 11A, ..., 11A, and a weak magnetic field state occurs.

From this state, if the application of hydraulic pressure to the first pressure chamber 101 is suspended, the outer periphery side rotor 12 and the inner periphery side rotor 76 rotate relatively because of repulsion by the magnetic force since the like poles of the outer peripheral permanent magnets 12A, ..., 12A and inner peripheral permanent magnets 11A, ..., 11A are generally facing each other. Moreover, during this action, the rotors further rotate relatively when the unlike poles of the outer peripheral permanent magnets 12A, ..., 12A and the inner peripheral permanent magnets 11A, ..., 11A approach each other and are attracted to each other. Thus, after the return to home position, a strong magnetic field state occurs. During this relative rotation, the ring gear 78, guided by the helical salines 81a, 94a and the helical salines 95a, 91a meshed with each other, supplies hydraulic oil to the second pressure chamber 102, and moves in the axial direction while draining hydraulic oil from the first pressure chamber 101 to come in contact with the flange 82 of the supporting member 73. Thus, the first pressure chamber 101 becomes narrow, and the second pressure chamber 102 becomes wide.

In this embodiment also, the rotating mechanism 70 sets the stroke of the ring gear 78, and the twist angles of the helical spline 81a, 94a, and the helical salines 95a, 91a such that the variable width of the relative phase between the inner periphery side rotor 76 and the outer periphery side rotor 12 can be varied on the advance angle side or the lag angle side only in the range of electrical angles below 180°. That is, by mechanically restricting the variable width of the relative phase for the drive plate 71, the supporting member 73 and the supporting member 74 of the ring gear 78, the variable width of the relative phase between the inner periphery side rotor 76 and the outer periphery side rotor 12 is set within the range of electrical angles below 180°. More specifically, settings are made to restrict rotation closer to the home position by a specific number of degrees of electrical angle only, for a home position (electrical angle 0°) where unlike poles of the outer peripheral permanent magnets 12A, ..., 12A and inner peripheral permanent magnets 11A, ..., 11A face each other, than the position of electrical angle 180° where like poles of the outer peripheral permanent magnets 12A and the inner peripheral permanent magnets 11A completely face each other.

In the present embodiment also, the relative phase between the inner periphery side rotor 76 and the outer periphery side rotor 12 is changed by supply/drainage of hydraulic oil for the first pressure chamber 101 and the second pressure chamber 102. Also, in the present embodiment, the change in phase at the ends of the two limits as mentioned above, is naturally at the intermediate positions between the ends of the two limits. When the hydraulic control device (not shown in the figures), stops the supply/drainage of hydraulic oil from the first pressure chamber 101 and the second pressure chamber 102, the outer periphery side rotor 12 and the inner periphery side rotor 76 maintain the phase relationship at that moment.

In view of the above, the drive plates 71, 71 and the supporting members 73, 74 are integrally operable with respect to the outer periphery side rotor 12, and they are integrally installed with the outer periphery side rotor 12 and the output shaft 72 so as to cover both end faces of the inner periphery side rotor 76 and the outer periphery side rotor 12 and transmit the rotating force to the output shaft 72. The ring gear 78 is disposed between the inner periphery side rotor 76 and the cylinder 81 of the supporting member 73. Helical salines 94a, 95a are connected to the helical spline 81a of the cylinder 81 and to the helical spline 91a of the inner periphery side rotor 76. Moreover, the ring gear 78, together with the drive plates 71, 71 and the supporting members 73, 74, defines the first pressure chamber 101 and the second pressure chamber 102 on the inside of the inner periphery side rotor 76. It moves in the axial direction by the supply/drainage of hydraulic oil to the first pressure chamber 101 and the second pressure chamber 102. That is, the ring gear 78 is linked so as to be integrally rotatable with the inner periphery side rotor 76, and by moving in the axial direction, it is also relatively rotatable.

According to the present embodiment described above, the rotating mechanism 70 supplies/drains hydraulic oil for the first pressure chamber 101 and the second pressure chamber 102 defined on the inside of the inner periphery side rotor 76 by the drive plates 71, 71 and the supporting members 73, 74, that transmit the drive force and are integrally and rotatably installed with respect to the outer periphery side rotor 12, and the ring gear 78 integrally and rotatably installed with respect to the inner periphery side rotor 76. As a result, the relative phase between the inner periphery side rotor 76 and the outer periphery side rotor 12 can be changed, and the induced voltage constant can be varied at the desired timing easily and accurately while inhibiting complexity of the electric motor 10. The result is that the range of operable rotational speed and the torque range can be expanded, the operating efficiency enhanced, and at the same time, the operable range at high efficiency can also be expanded.

Furthermore, by inhibiting the amount of hydraulic oil supplied to the first pressure chamber 101 and the second pressure chamber 102, the relative phase between the inner periphery side rotor 76 and the outer periphery side rotor 12 can be varied steplessly in the desired range of electrical angles below 180° between the strong magnetic field state and the weak magnetic field state.

In addition, since the drive plates 71, 71, and the supporting members 73, 74, and the ring gear 78 define the first pressure chamber 101 and the second pressure chamber 102 on the inside of the inner periphery side rotor 76, the increase in the thickness, particularly in the direction along the rotational axis can be inhibited and the motor can be made more compact.

When hydraulic oil is supplied/drained for the first pressure chamber 101 and the second pressure chamber 102 formed by the drive plates 71, 71, the supporting members 73, 74, and the ring gear 78, the ring gear 78 moves in the axial direction relative to the drive plates 71, 71, the supporting members 73, 74, and the outer periphery side rotor 12. However, since the ring gear 78 is disposed between the cylinder 81 of the supporting member 73 and the inner periphery side rotor 76, and is connected to the helical spline 81*a* of the cylinder 81 and the helical spline 91*a* of the inner periphery side rotor 76 by the helical salines 94*a*, 95*a*, the relative phase between the inner periphery side rotor 76, the output shaft 72, the drive plates 71, 71, the supporting members 73, 74, and the outer periphery side rotor 12 can be varied by the shift in the axial direction. In this way, by using a simple actuator mechanism that shifts the ring gear 78 with helical salines 94*a*, 95*a* in the axial direction as the rotating mechanism 70, the induced voltage constant can be varied easily and accurately at the desired timing while properly inhibiting complexity of the electric motor 10.

Third Embodiment

Figure 13:
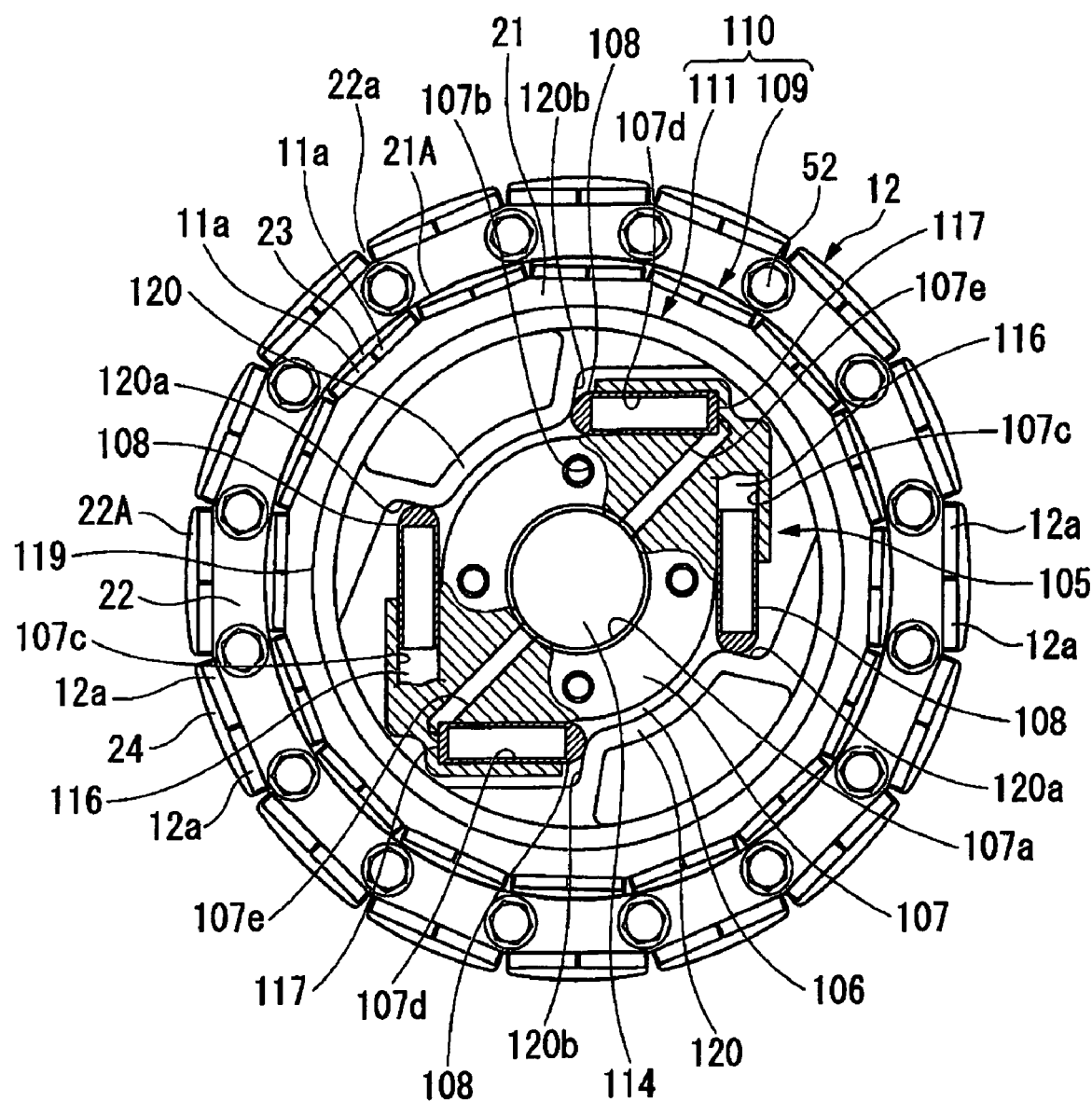
FIG. 13 is an elevation view showing the inner periphery side rotor, the outer periphery side rotor, and the rotating mechanism of the electric motor in the weak magnetic field state, wherein one part thereof is shown in a cross-section and a drive plate in front is removed.

Next, an electric motor according to a third embodiment of the present invention will be explained below with mainly reference to FIG. 13 with the focus on the differences with the first embodiment mentioned above. In parts that are the same as those in the first embodiment, the same reference numerals are applied and their explanations are omitted.

In this embodiment also, a rotating mechanism 105 is used, which differs from the corresponding mechanism in the first embodiment mentioned above.

The rotating mechanism 105 of the present embodiment is provided with a pair or drive plates 106 (only one drive plate shown in FIG. 14) integrally and rotatably fixed on both sides of the outer periphery side rotor 12 in the axial direction, a housing (first member) 107 integrally and rotatably fixed between the drive plates 106, multiple pistons (second members) 108, . . . , 108 (specifically 4 in number) slidably supported in the housing 107, a rotor body at the inner periphery 109 similar to the inner periphery side rotor 11 of the first embodiment mentioned above, and an internal member 111 provided with a rotor body at the inner periphery 109, and an inner periphery side rotor 110 integrally and rotatably press-fitted to the inside of a rotor body at the inner periphery 109.

A through fitting hole 107*a* for fitting the output shaft (rotating shaft) 114 to the body is provided at the center of the housing. Multiple screw holes 107*b*, . . . , 107*b* to secure the two drive plates 106 by bolts are formed around the fitting holes 107*a* on the same circumference at equidistant spacing. The output shaft 114 mentioned above is connected to the body by spline connection in the fitting hole 107*a*. Thus, the housing 107 is integrated with the output shaft 114 that transmits the drive force of the outer periphery side rotor 12 and the outer periphery side rotor 12.

A pair of holes 107*c*, 107*d* are formed in a direction perpendicular to the axis of the fitting hole 107*a* such that they are parallel to the pair of mutually orthogonal axes in the housing 107. Thus, two pairs symmetric arrangements each provided with a pair of holes 107*c*, 107*d* are formed on either side of the fitting hole 107*a*. Passage holes (not shown in the figures) linking the bottom sides of each of the holes 107*c*, 107*c* opening to the same one side in the direction of rotation in each pair and passage holes 107*e*, 107*e* linking to the bottom sides of each of the holes 107*d*, 107*d* opening to the same opposite side in the direction of rotation of each pair are formed in the housing 107 from the fitting hole 107*a*. The linking holes 107*e*, 107*e* and linking holes (not shown in the figures) link the individual linking grooves (not shown in the figures) of the output shaft 114 and the passage holes.

The piston 108 mentioned above is slidably engaged to each of the holes 107*c*, 107*c*, 107*d*, 107*d* formed in the housing 107. The pistons 108 inserted in each of the holes 107*c*, 107*c* opening to the same one side in the direction of rotation define each of the first pressure chambers 116 linking the passage holes (not shown in the figures) between the holes 107*c*. The pistons 108 each inserted in the holes 107*d*, 107*d* opening to the same opposite side in the direction of rotation define each of the second pressure chambers 117 linking the passage holes 107*e* between the holes 107*d*. The first pressure chambers 116, 116 and the second pressure chamber 117, 117 are filled with hydraulic oil even when they are in a state when no hydraulic pressure is received.

The internal member 111 is provided with a circular shaped base section 119 engaged on the inside of the rotor body at the inner periphery 109, and a pair of protruding sections 120, 120 protruding toward the center from a position facing the inner periphery of the base section 119. A wall face 120*a* that comes in contact with the piston 108 inserted in each of the holes 107*c* facing each other, and a wall face 120*b* that comes in contact with the piston 108 inserted in each of the holes 107*d* facing each other, are formed in the protruding sections 120, 120. All the pistons 108, . . . , 108, are integrally rotatable with the inner periphery side rotor 110 when they are in contact with the wall faces 120*a*, 120*b* facing the pistons.

In the present embodiment also, the strong field position (position at electrical angle 0°) generated when the outer peripheral permanent magnets 12A, . . . , 12A (refer to the first embodiment) and the inner peripheral permanent magnets 11A, . . . , 11A (refer to the first embodiment) of the outer periphery side rotor 12 and the inner periphery side rotor 110 are disposed with their opposite poles facing each other so as to attract each other, is set at the home position when the first pressure chambers 116, 116 and the second pressure chamber 117, 117 do not receive substantial hydraulic pressure. When at this home position, the first pressure chambers 116, 116 are at their narrowest, and the piston 108 that defines the first pressure chambers 116, 116 is in contact with the bottom part of the hole 107*c*, while in contact with the wall face 120*a*; at the same time, the second pressure chambers 117, 117 are at their widest, and the piston 108 that defines the second pressure chambers 117, 117, separates from the bottom part of the hole 107*d*, while in contact with the wall face 120*b*.

From this home position state, if hydraulic oil is supplied to the first pressure chambers 116, 116 (that is, hydraulic pressure is supplied to the first pressure chambers 116, 116), and at the same time, if hydraulic oil is drained from the second pressure chambers 117, 117, the piston 108 that defines the first pressure chambers 116,116, separates from the bottom part of the hole 107*c* while touching the wall face 120*a*. On the other hand, the piston 108 that defines the second pressure chambers 117, 117, comes in contact with the bottom part of the hole 107d while touching the wall face 120b. The result is that the second pressure chambers 117, 117 become narrow, while the first pressure chambers 116,116, become wide (the state shown in FIG. 13). As a result, the outer periphery side rotor 12 and the inner periphery side rotor 110 change to a weak magnetic field state after rotating relatively in reaction to the magnetic force of the outer peripheral permanent magnets 12A, . . . , 12A and the inner peripheral permanent magnets 11A, . . . , 11A.

From this state, if the introduction of hydraulic pressure to the first pressure chambers 116, 116 is suspended, the outer periphery side rotor 12 and the inner periphery side rotor 110 rotate relatively because of repulsion by the magnetic force since the like poles of the outer peripheral permanent magnets 12A, . . . , 12A and inner peripheral permanent magnets 11A, . . . , 11A are generally facing each other. Moreover, during this action, the rotors further rotate relatively when the unlike poles of the outer peripheral permanent magnets 12A, . . . , 12A and the inner peripheral permanent magnets 11A, . . . , 11A approach each other and are attracted to each other. Thus, after the return to home position, a strong magnetic field state occurs. During this relative rotation, the piston 108 that defines the first pressure chambers 116, 116, is pressed against the wall face 120a and moves while draining hydraulic oil from the first pressure chambers 116, 116, and comes in contact with the bottom part of the hole 107c; thus, the first pressure chambers 116, 116 become narrow. At this stage, a very small hydraulic pressure is introduced just to maintain the state of contact of the piston 108 in the second pressure chambers 117, 117 with the wall face 120b.

In this embodiment also, the rotating mechanism 105 sets the stroke of the pistons 108, . . . , 108, and the width in the circumferential direction of the protruding sections 120, 120, such that the variable width of the relative phase between the inner periphery side rotor 11 and the outer periphery side rotor 12 for can be varied on the advance angle side or the lag angle side only in the range of electrical angles below 180°. That is, the by mechanically restricting the variable width of the relative phase for the housing 107 of the pistons 108, . . . , 108, the variable width of the relative phase between the inner periphery side rotor 11 and the outer periphery side rotor 12 can be set in the range of electrical angles below 180°. More specifically, settings are made to restrict rotation closer to the home position by a specific number of degrees of electrical angle only, for a home position (electrical angle 0°) where unlike poles of the outer peripheral permanent magnets 12A, . . . , 12A and inner peripheral permanent magnets 11A, . . . , 11A face each other, than the position of electrical angle 180° where like poles of the outer peripheral permanent magnets 12A and the inner peripheral permanent magnets 11A completely face each other.

In view of the above, in the present embodiment also, the relative phase between the inner periphery side rotor 110 and the outer periphery side rotor 12 is changed by supply/drainage of hydraulic oil for the first pressure chambers 116, 116 and the second pressure chambers 117, 117. In the present embodiment also, even after the change in phase at the ends of the two limits as mentioned above, when the hydraulic control device (not shown in the figures) stops the supply/drainage of hydraulic oil from the first pressure chambers 116, 116 and the second pressure chambers 117, 117, at the intermediate positions between the ends of the two limits, the outer periphery side rotor 12 and the inner periphery side rotor 110 maintain the phase relationship at that moment.

Thus, the housing 107 is integrally rotatable with respect to the outer periphery side rotor 12, and is also installed integrally with the outer periphery side rotor 12 and with the output shaft 114 that transmits the drive force of the outer periphery side rotor 12. Moreover, the piston 108 is installed integrally and rotatably with respect to the inner periphery side rotor 110, is inserted in the hole 107c or in the hole 107d formed in the housing 107, defines the first pressure chamber 116 or the second pressure chamber 117 on the inside of the inner periphery side rotor 110, and is in contact with the wall face 120a or the wall face 120b of the inner periphery side rotor 110.

Thus, according to the present embodiment described above, the rotating mechanism 105 supplies hydraulic oil to the first pressure chambers 116, 116 and the second pressure chambers 117, 117 defined on the inside of the inner periphery side rotor 110 by the housing 107 integrally and rotatably installed with respect to the outer periphery side rotor 12, the pistons 108, . . . , 108, integrally and rotatably installed with respect to the inner periphery side rotor 110, and thereby changes the relative phase between the inner periphery side rotor 110 and the outer periphery side rotor 12. Consequently, the induced voltage constant can be varied easily and accurately at the desired timing while inhibiting complexity of the electric motor 10. The result is that the range of operable rotational speed and the torque range can be expanded, the operating efficiency enhanced, and at the same time, the operable range at high efficiency can also be expanded.

Furthermore, by inhibiting the amount of hydraulic oil supplied to the first pressure chambers 116, 116 and the second pressure chambers 117, 117, the relative phase between the inner periphery side rotor 110 and the outer periphery side rotor 12 can be varied steplessly in the desired range of electrical angles below 180° between the strong magnetic field state and the weak magnetic field state.

Furthermore, since the housing 107 and the piston 108 define the first pressure chambers 116, 116 and the second pressure chambers 117,117 on the inside of the inner periphery side rotor 110, the increase in the thickness particularly in the direction of rotational axis can be inhibited and the electric motor can be made compact.

Also, if hydraulic oil is supplied/drained for the first pressure chambers 116, 116 and the second pressure chambers 117, 117 formed by the housing 107 and the piston 108, then the pistons 108, 108 that define the first pressure chambers 116, 116 may increase the protrusion, and conversely, the pistons 108, 108 that define the second pressure chambers 117, 117 may increase the protrusion. The result is that the relative phase between the inner periphery side rotor 110 that brings the pistons 108, . . . , 108 in contact with the wall face 120a, 120a, or the wall face 120b, 120, and the integrally installed housing 107, the outer periphery side rotor 12 and the output shaft 114, changes. In this way, since the rotating mechanism 105 uses a simple actuator using pistons 108, . . . , 108, the induced voltage constant can be varied easily and accurately at the desired timing while properly inhibiting complexity of the electric motor 10.

If the rotating mechanism is such that the relative phase between the inner periphery side rotor 11 and the outer periphery side rotor 12 can be varied by rotating at least the inner periphery side rotor 11 or the outer periphery side rotor 12 around the rotational axis, then it can be applicable to other kinds of motors.

Fourth Embodiment

Next, an electric motor according to a fourth embodiment of the present invention will be explained below, referring mainly to FIGS. 1 to 4, and FIGS. 14 to 20, with the focus on the differences with the first embodiment mentioned above.

In parts that are the same as those in the first embodiment, the same reference numerals are applied and their explanations are omitted.

In the present embodiment, the direction of rotation of the rotors 11, 12 during positive rotation are set such that the first pressure chamber 56 becomes the advance angle side pressure chamber 56 and the second pressure chamber 57 becomes the lag angle side pressure chamber 57. That is, the advance angle side pressure chamber 56 rotates the inner periphery side rotor 11 relatively in the advance angle direction with respect to the outer periphery side rotor 12 by the pressure of the hydraulic fluid supplied to it. The lag angle side pressure chamber 57 rotates the inner periphery side rotor 11 relatively in the lag angle direction with respect to the outer periphery side rotor 12 by the pressure of the hydraulic fluid supplied to it. In this case, the "advance angle" refers to the angle of advance of the inner periphery side rotor 11 in the direction of rotation of electric motor 1 shown by the arrow R in FIG. 2 and FIG. 4, with respect to the outer periphery side rotor 12. Also, the "lag angle" refers to the angle of lag of the inner periphery side rotor 11 in the opposite direction as the direction of rotation R of the electric motor 1, with respect to the outer periphery side rotor 12.

As shown in FIG. 4, when the inner periphery side rotor 11 moves to the lag angle side with respect to the outer periphery side rotor 12, a strong magnetic field state occurs as the unlike poles of the outer peripheral permanent magnets 12A, . . . , 12A of the outer periphery side rotor 12, and the inner peripheral permanent magnets 11A, . . . , 11A of the inner periphery side rotor 11 face and approach each other. As shown in FIG. 2, when the inner periphery side rotor 11 moves to the advance angle side with respect to the outer periphery side rotor 12, a weak magnetic field state occurs as the like poles of the outer peripheral permanent magnets 12A, . . . , 12A of the outer periphery side rotor 12 and the inner peripheral permanent magnets 11A, . . . , 11A of the inner periphery side rotor 11 face and approach each other.

Figure 14:
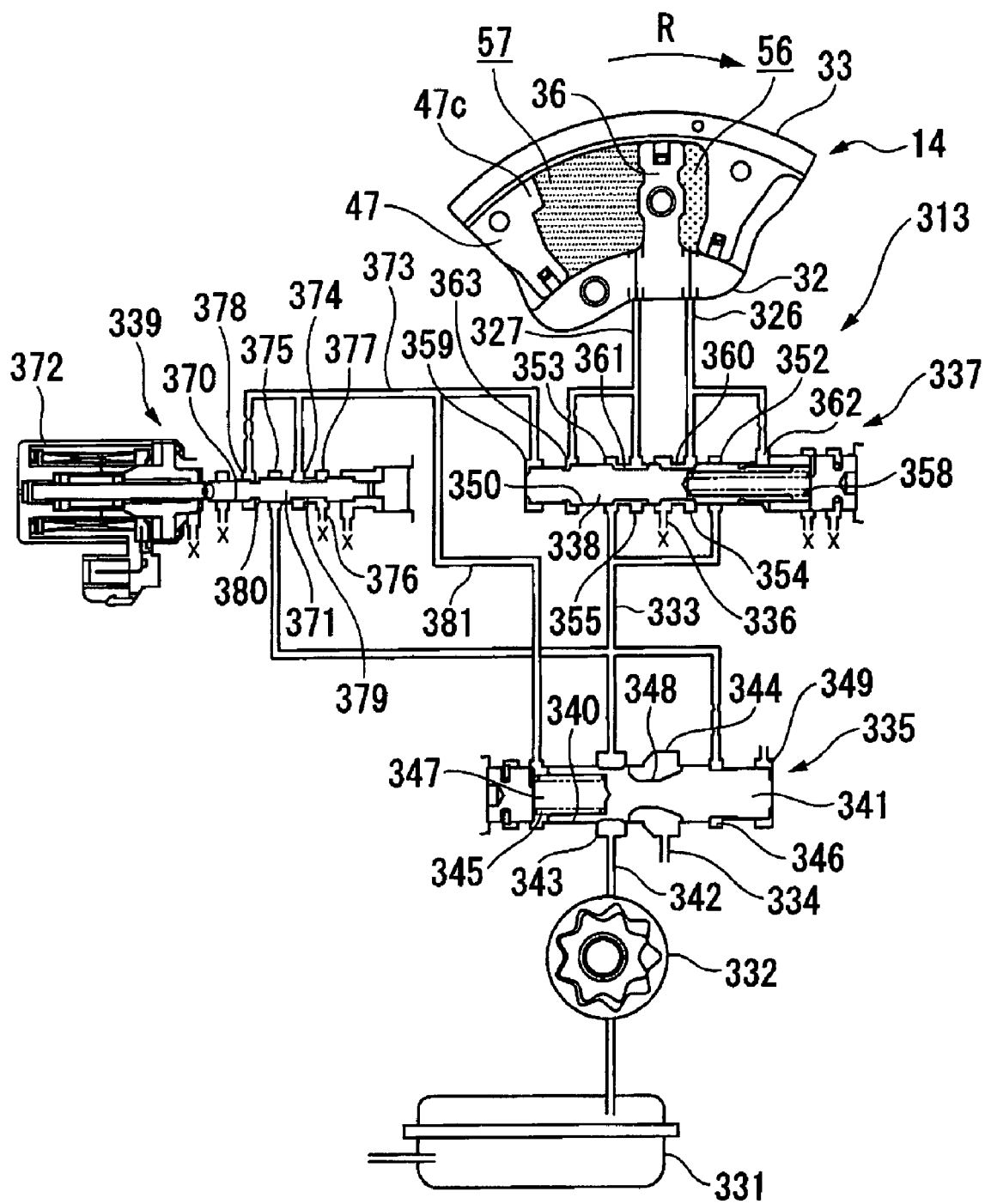
FIG. 14 is a hydraulic circuit diagram with the focus on a hydraulic control device of a fourth embodiment of the present invention.

The advance angle side pressure chamber 56 is connected to the advance angle side supply/drainage passage 326 of the hydraulic control device 313 shown in FIG. 14, while the lag angle side pressure chamber 57 is connected to the lag angle side supply/drainage passage 327 of the same hydraulic control device 313.

As shown in FIG. 14, the hydraulic control device 313 is provided with an oil pump 332 that draws up and discharges hydraulic fluid in an oil tank 331, a regulating valve 335 that regulates the hydraulic fluid discharged by the oil pump 332 and supplies it to a high pressure line passage 333, and delivers the excess hydraulic fluid to a low pressure passage 334 for lubricating and cooling various kinds of equipment, a spool-type flow passage switching valve 337 that distributes the hydraulic fluid supplied to line passage 333 to the advance angle side supply/drainage passage 326 and the lag angle side supply/drainage passage 327, and also discharges the unwanted hydraulic fluid in the advance angle side supply/drainage passage 326 and the lag angle side supply/drainage passage 327 to a drain passage 336, and an electromagnetic pressure regulating valve 339 that regulates the pressure of fluid introduced from the line passage 333 and controls the position of the spool 338 of the flow passage switching valve 337 at that pressure.

Figure 18:
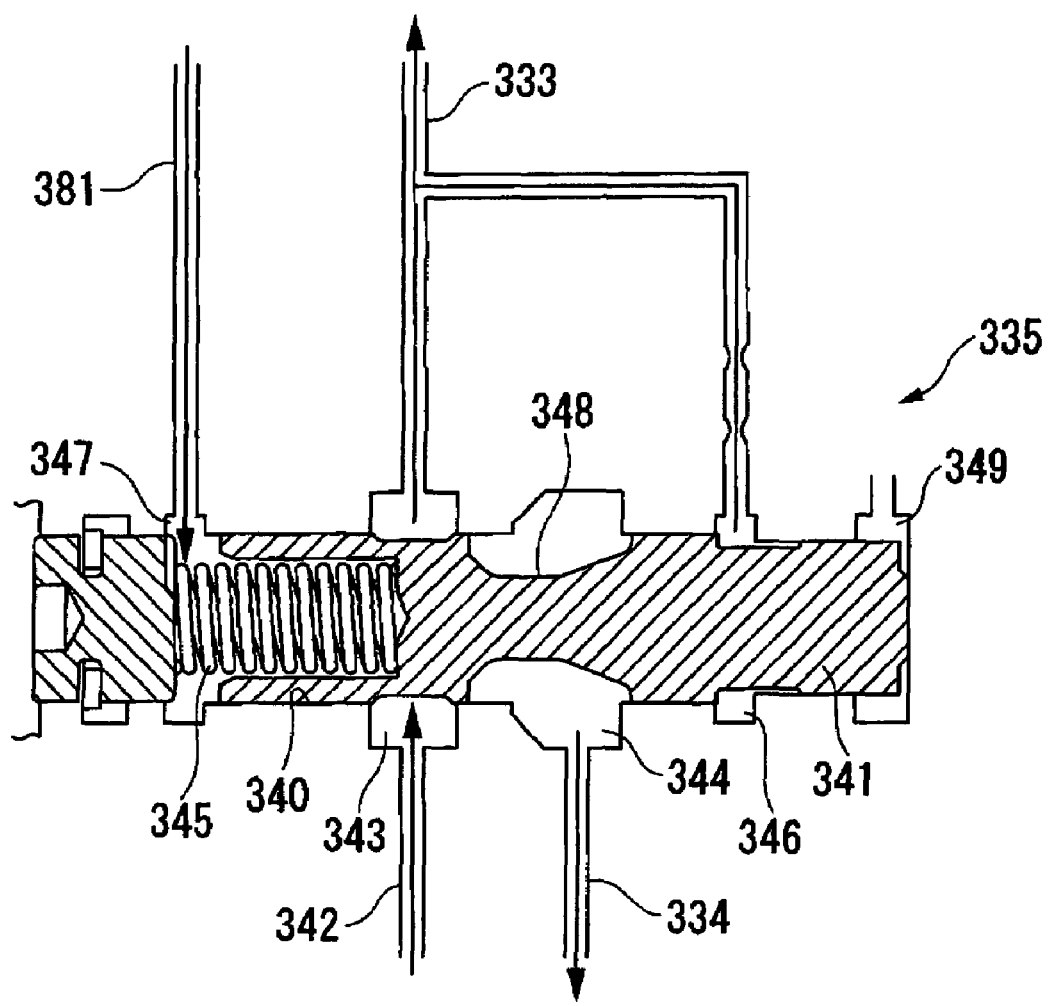
FIG. 18 is a schematic cross-sectional view of the regulating valve of the fourth embodiment.

As shown in FIG. 18, the regulating valve 335 is provided with a control spool 341 that is housed so as to slide freely in a valve housing chamber 340, a pump side passage 342 formed on the inner peripheral surface at approximately the center of the valve housing chamber 340, an annular supply port 343 that always links the line passage 333, an annular discharge port 344 that links a low pressure passage 334 and is formed at a position adjacent to the supply port 343 of the valve housing chamber 340, a spring 345 disposed at the side of one end (left side in the Figure) of the valve housing chamber 340 that applies a force on the control spool 341 toward the side of the other end (right side shown in the Figure), a spool control chamber 346 installed near the other end of the valve housing chamber 340 that applies the pressure of the line passage 333 on the control spool 341 installed near the other end of the valve housing chamber 340 in a direction that resists the force of the spring 345, and a reaction pressure regulating chamber 347 installed at the side of one end of the valve housing chamber 340 housed in the spring 345 and in which the regulating pressure mentioned later is applied.

An annular discharge guide groove 348 with a groove width that extends over the supply port 343 and the discharge port 344 on the side of the valve housing chamber 340 is formed at generally the center of the outer peripheral surface in the axial direction of the control spool 341. The excess hydraulic fluid is discharged from the supply port 343 to the discharge port 344 (low pressure passage 334) through the discharge guide groove 348. The control spool 341 receives the biasing force of the spring 345 in the initial state when the pressure of the line passage 333 is low, and moves over the maximum distance to the side at the other end (right side in the Figure) of the valve housing chamber 340. The discharge guide groove 348 cuts off the link of the supply port 343 and the discharge port 344.

When the control spool 341 moves from this state to the side of one end (left side in the Figure) to resist the force of the spring 345, the discharge guide groove 348 increases the area of the opening that links the supply port 343 and the discharge port 344 in response to the distance moved (in response to the position of the control spool 341). The position of the control spool 341 is basically controlled by the balance of the pressure in the line passage 333 supplied to the spool control chamber 346 and the reaction of the spring 345. Depending on the position moved to, it controls the pressure in the line passage 333. However, regulating pressure described later, is introduced appropriately in the reaction pressure regulating chamber 347 in response to the operating state of the electric motor 1; therefore, when pressure other than atmospheric pressure is supplied to the reaction pressure regulating chamber 347, the reaction force is added by the regulating pressure in the reaction force of spring 345.

The reference numeral 349 in FIGS. 14 and 18 indicates the atmospheric pressure port installed at the other end of the spool housing chamber 46.

Figure 15:
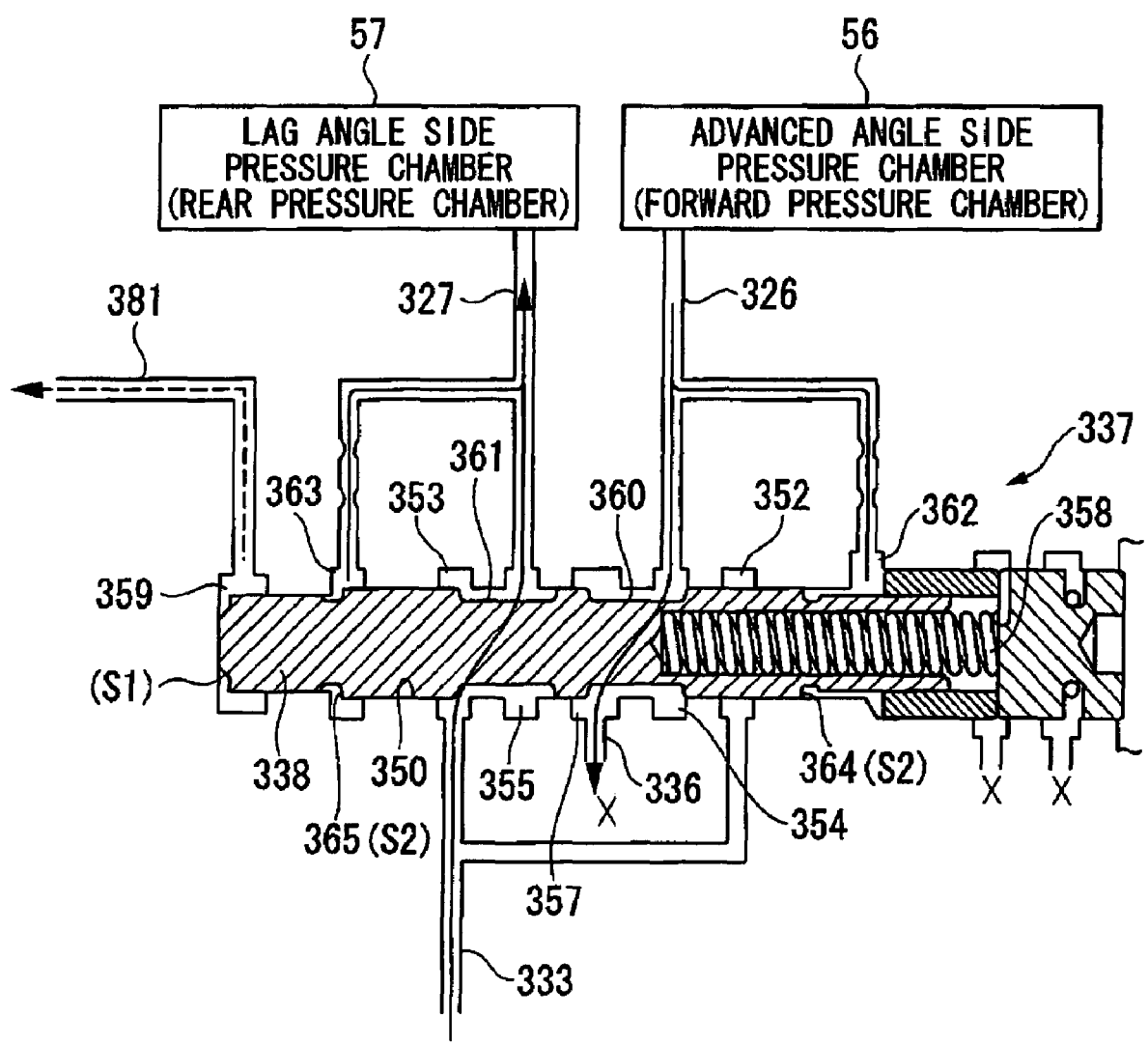
FIG. 15 is a schematic cross-sectional view of a flow passage switching valve of the fourth embodiment.
Figure 17:
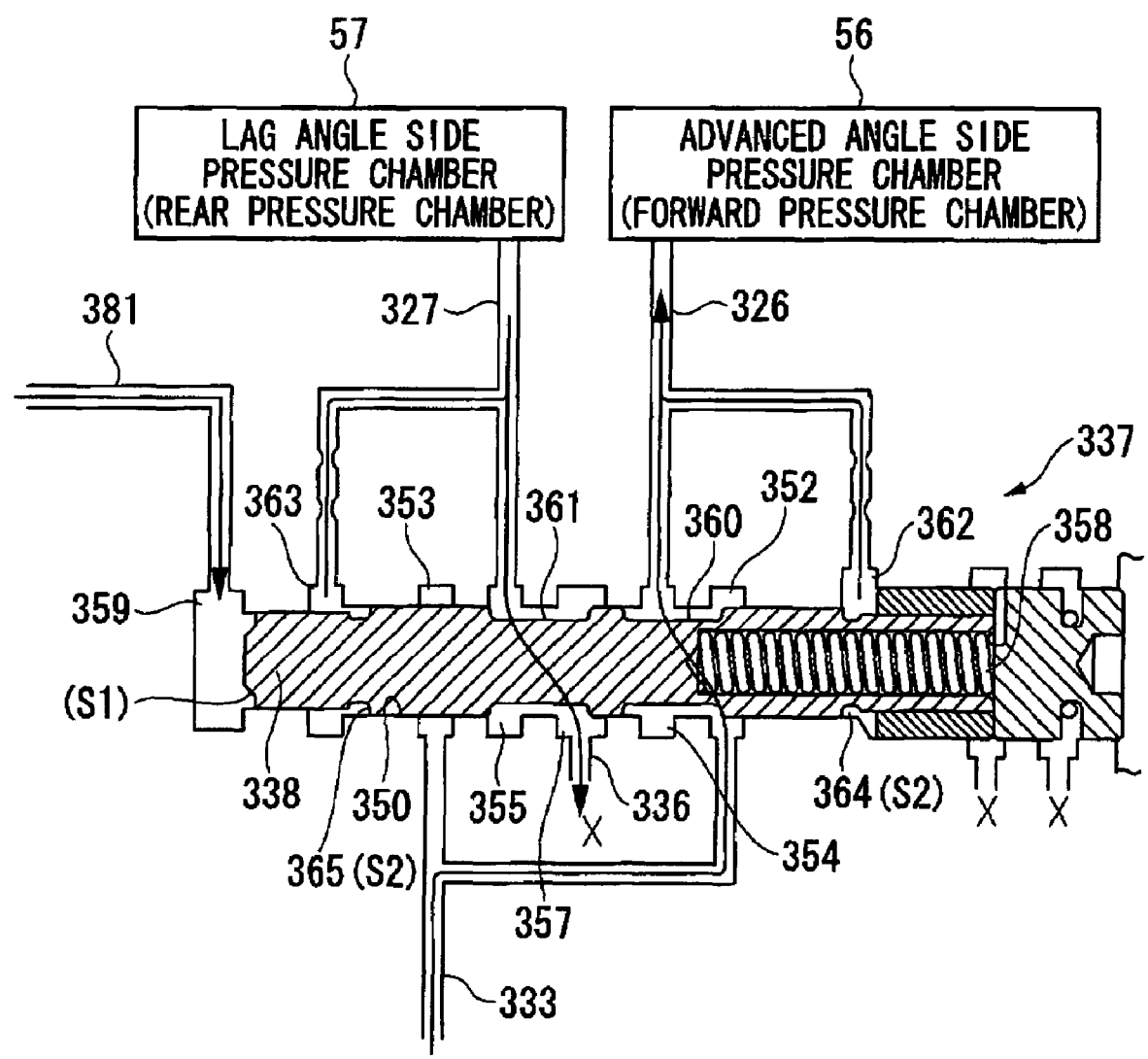
FIG. 17 is a schematic cross-sectional view of the flow passage switching valve of the fourth embodiment.

On the other hand, as shown in FIGS. 15 and 17, the flow passage switching valve 337 is provided with a spool 338 housed to slide freely in the valve housing chamber 350, annular first and second supply ports 352, 353 leading to the line passages 333 formed at two separated positions along the axial direction of the valve housing chamber 350, an annular advance angle side supply/drainage port 354 leading to the advance angle side supply/drainage passage 326 formed at a position adjacent to the first supply port 352 between the first and second supply ports 352, 353, of the valve housing chamber 350, an annular lag angle side supply/drainage port 355 leading to the lag angle side supply/drainage passage 327 formed at a position adjacent to the second supply port 353 between the first and second supply ports 352, 353 of the valve housing chamber 350, an annular discharge port 357 leading to the drain passage 336 formed at an intermediate position between the advance angle side supply/drainage port 354 and the lag angle side supply/drainage port 355 of the valve housing chamber 350, a spring 358 disposed at the side on one end (right side in the Figure) of the valve housing chamber 350 that biases the spool 338 to the side on the other end (right side in the Figure), and a control chamber 359 installed at the other end of the valve housing chamber 350 that applies spool control pressure on the end face of the spool 338.

An annular first guide groove 360 with groove width extending over the first supply port 352 and the advance angle side supply/drainage port 354, and an annular second guide groove 361 with groove width extending over the second supply port 353 and the lag angle side supply/drainage port 355 are formed at two separated positions generally near the center of the outer peripheral surface in the axial direction of the spool 338. The width separating the first supply port 352 and the advance angle side supply/drainage port 354, and the width separating the advance angle side supply/drainage port 354 and the discharge port 357 are approximately equal. Similarly, the width separating the second supply port 353 and the lag angle side supply/drainage port 355, and the width separating the lag angle side supply/drainage port 355 and the discharge port 357 are approximately equal. Depending on the position moved to by the spool 338 in the valve housing chamber 350, the first guide groove 360 increases/decreases the area of the opening linking the advance angle side supply/drainage port 354 for the first supply port 352 and the discharge port 357. At the same time, the second guide groove 361 increases/decreases the area of the opening linking the lag angle side supply/drainage port 355 for the second supply port 353 and the discharge port 357. The spool 338 reciprocally increases/decreases the pressure of the advance angle side supply/drainage port 354 and the lag angle side supply/drainage port 355 in response to the position moved to in the valve housing chamber 350.

The flow passage switching valve 337 determines the position of advance/retraction of the spool 338 by the balance between the biasing force of the spring 358 and the spool control pressure supplied to the control chamber 359. However, in the present embodiment, an advance angle side feedback chamber 362 that introduces the pressure of the advance angle side supply/drainage passage 326 (advance angle side pressure chamber 56) and applies it on spool 338 as the thrust in the same direction as the biasing force of the spring 358, and a lag angle side feedback chamber 363 that introduces the pressure of the lag angle side supply/drainage passage 327 (lag angle side pressure chamber 57) and applies it as thrust in the opposite direction as the biasing force of the spring 358 on the spool 338, are installed in the flow passage switching valve 337. The pressure of these feedback chambers 362, 363 also becomes one of the elements for deciding the position of advance/retraction of the spool 338.

More specifically, the advance angle side feedback chamber 362 has been formed considering the stepped surface 364 installed nearer to one end of the spool 338, while the lag angle side feedback chamber 363 has been formed considering the stepped surface 365 installed nearer to the other end of the spool 338. The stepped surfaces 364, 365 considered in the two feedback chambers 362, 363 are each assumed as the area receiving the same pressure, and pressure corresponding to the difference in pressure in the two feedback chambers 362, 363 acts on the entire spool 338.

That is, as shown in FIG. 15, if the area receiving pressure on the end face of the spool 338 considering the control chamber 359 is taken as S1, the area receiving pressure of the stepped surfaces 364, 365 of the two feedback chambers 362, 363 is taken as S2, then pressure and force on each part, are:

Spool control pressure: Pso1

Pressure of the lag angle side pressure chamber 57: Pr

Pressure of the advance angle side pressure chamber 56: Pa, and

The reaction force of the spring 358 is taken as Fx, then the balance of forces during position control of the spool 338 becomes: $(Pso1 \times S1) + (Pr \times S2) = (Pa \times S2) + Fs$. This can be rewritten as $(Pa - Pr) \times S2 = Pso1 \times S1 - Fs$.

Consequently, a force depending on the difference in pressure (difference in the pressures of the two feedback chambers 362, 363) of the advance angle side pressure chamber 56 and the lag angle side pressure chamber 57 acts on the spool 338, and the difference in pressure of the advance angle side pressure chamber 56 and the lag angle side pressure chamber 57 is controlled proportional to the spool control pressure.

Figure 16:
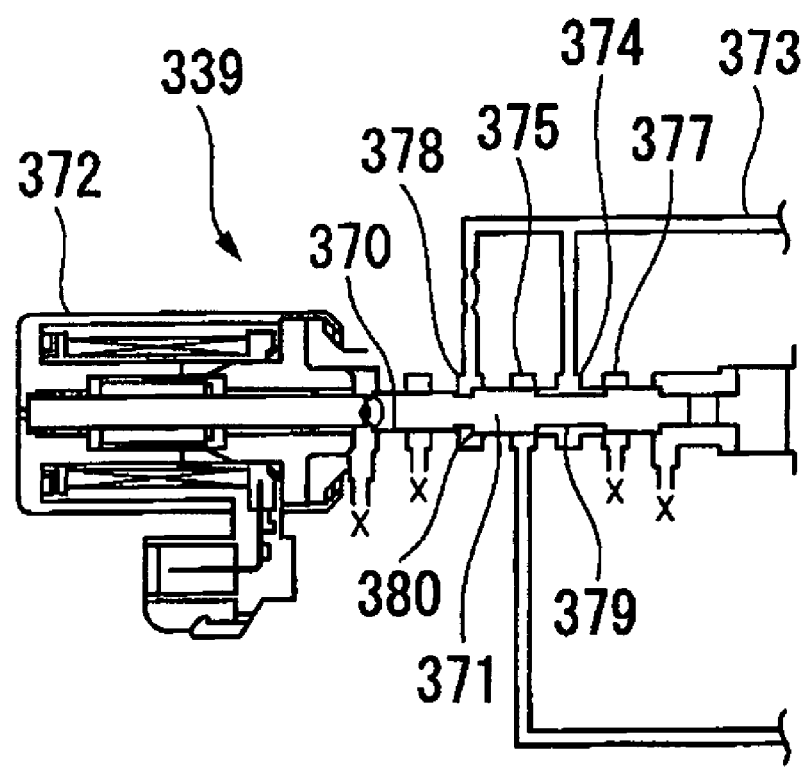
FIG. 16 is a schematic cross-sectional view of a pressure regulating valve of the fourth embodiment.

As shown in FIGS. 14 and 16, the pressure regulating valve 339 is provided with a spool 371 housed so as to be freely slidable in the valve housing chamber 370, an electromagnetic solenoid 372 that advances/retracts the spool 371, an annular control port 374 formed generally at the center of the valve housing chamber 370 in the axial direction and leads to the control chamber 359 of the flow passage switching valve 337 through the connecting passage 373, an annular line pressure port 375 formed at a position adjacent to and on one side of the control port 374 of the valve housing chamber 370 and leads to the line passage 333, an annular discharge port 377 formed at a position adjacent to and on the other side of the control port 374 of the valve housing chamber 370 and leads to the drain passage 376, and a control pressure supply port 378 formed at a position near the electromagnetic solenoid 372 of the valve housing chamber 370 and leads to the connecting passage 373 mentioned above.

An annular guide groove 379 that leads always to the control port 374 is formed at a position generally at the center of the outer peripheral surface of the spool 371 in the axial direction. The overlap of the guide groove 379 for the line pressure port 375 and the discharge port 377 can be continually adjusted in response to the position to which the spool 371 moves. The position of advance/retraction of the spool 371 is determined by the balance of the magnetic force of the electromagnetic solenoid 372 and the force of the reaction spring (not shown in the figures). The position of the spool 371 is changed in response to the increase in magnetic force of the electromagnetic solenoid 372. More specifically, the control port 374 maintains pressure of the control chamber 359 of the flow passage switching valve 337 at atmospheric pressure by being connected only to the discharge port 377 in the initial state when the electromagnetic solenoid 372 is OFF. In this state, when the electromagnetic solenoid 372 becomes ON and the magnetic force increases, the spool 371 moves in response to the increase in this magnetic force, and the area of the opening connecting the control port 374 and the line pressure port 375 increases. As a result, the pressure of the control chamber 359 of the flow passage switching valve 337 increases in response to the shift of the spool 371. The maximum pressure is the same as the pressure of the line passage 333. Accordingly, the pressure regulating valve 339 can regulate the pressure of the control chamber 359 in the range between 0 and the line pressure (pressure of the line passage 333).

A stepped surface 380 is provided at the base end side of the spool 371. The pressure of the connecting passage 373 acts on this stepped surface 380 through the control pressure supply port 378.

A branching passage 381 is installed in the connecting passage 373. This branching passage 381 is connected to the reaction pressure regulating chamber 347 of the regulating valve 335. The pressure of the connecting passage 373, that is, the spool control pressure of the flow passage switching valve 337 is supplied as the regulating pressure mentioned above, to the reaction pressure regulating chamber 347. Consequently, the reaction force resisting the pressure of the spool control chamber 346 of the regulating valve 335 is the same as the reaction force of the spring 345 to which the spool control pressure of the flow passage switching valve 337 is added. During a change in phase of the rotors 11, 12, when the spool control pressure increases, the regulating pressure of the regulating valve 335 increases proportionally, and the pressure of the line passage 333 increases.

In case of the electric motor 1, as shown in FIG. 4, the state wherein the protruding sections 47, ..., 47 of the housing 33 come in contact with the blades 36, ..., 36 of the vane rotor 32 respectively on the side of the advance angle side pressure chamber 56, is the state wherein the inner periphery side rotor 11 is mechanically the most on lag angle side compared to the outer periphery side rotor 12. At this stage, a strong magnetic field state occurs as the unlike poles of the outer peripheral permanent magnets 12A, ..., 12A of the outer periphery side rotor 12 and the inner peripheral permanent magnets 11A, ..., 11A of the inner periphery side rotor 11 face each other. Conversely, as shown in FIG. 2, the state wherein the stoppers 47c, ..., 47c of the housing 33 come in contact with the blades 36, ..., 36 of the vane rotor 32 is the state wherein the inner periphery side rotor 11 is mechanically the most on the advance angle side compared to the outer periphery side rotor 12. At this stage, a weak magnetic field state occurs as the like poles of the outer peripheral permanent magnets 12A, ..., 12A and the inner peripheral permanent magnets 11A, ..., 11A face each other.

In this way, similar to the first embodiment, the variable width of the relative phase between the inner periphery side rotor 11 and the outer periphery side rotor 12 is set mechanically for electrical angles in the range greater than 0° but less than 180°. However, in the present embodiment, the control unit (not shown in the figures) restricts the variable width of the relative phase for the vane rotor 32 of the housing 33 by hydraulic fluid supplied to the pressure chambers 56, 57, and sets it mechanically within a narrower range than the limiting range mentioned above.

By imposing restrictions in the present embodiment in this way, the rotary reaction force between the inner periphery side rotor 11 and the outer periphery side rotor 12 is made to increase almost linearly when the inner periphery side rotor 11 is displaced from the lag angle side to the advance angle side.

Figure 19A:
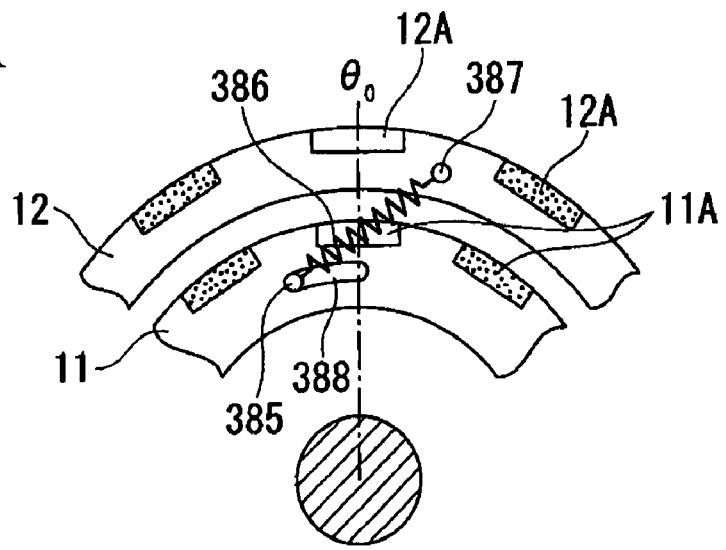
FIGS. 19A to 19C show the fourth embodiment. Operations of devices which linearly increases the rotary reaction force are sequentially shown in the schematic cross-sectional views of FIG. 19A, FIG. 19B and FIG. 19C.
Figure 19B:
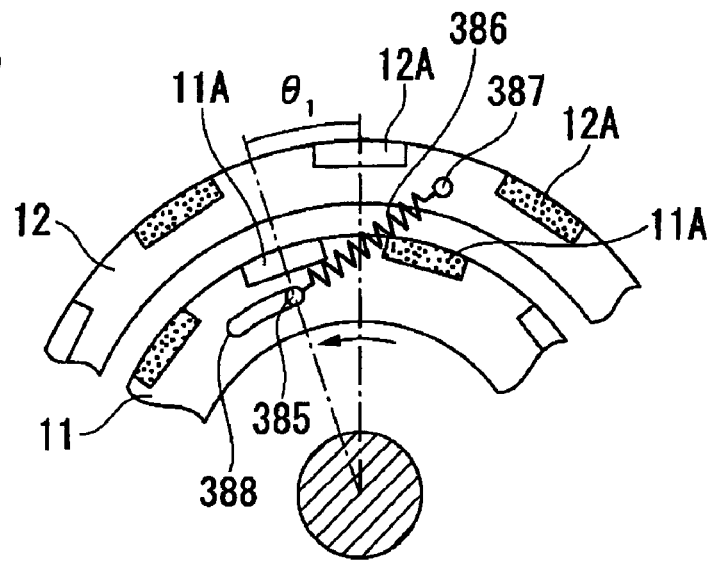
Figure 19C:
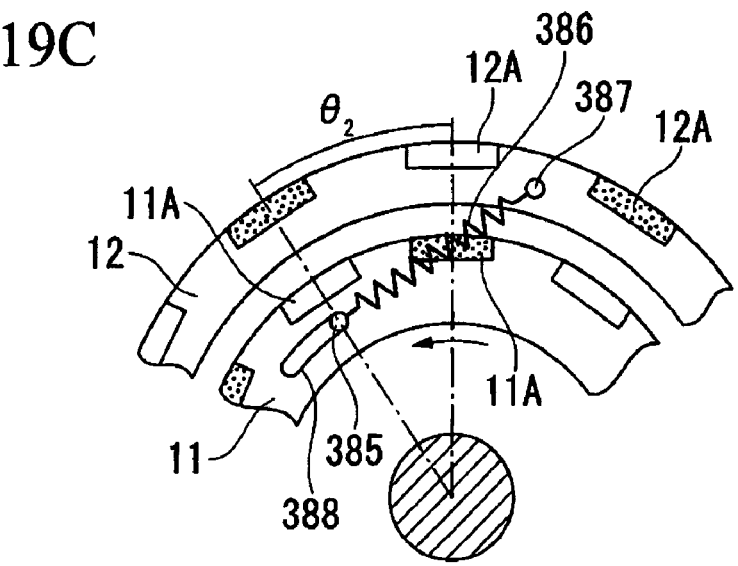
Figure 20:
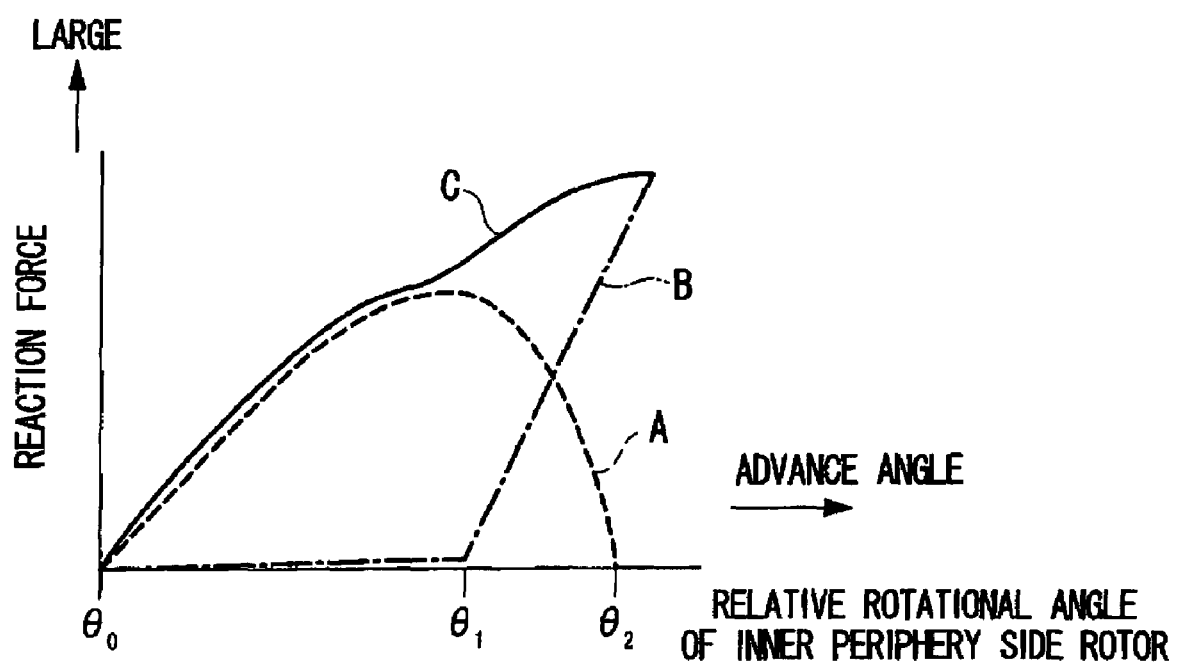
FIG. 20 is a characteristics diagram showing the state of change in the rotary reaction force in response to increasing relative rotational angle of the inner periphery side rotor.

Many different devices are available for increasing the rotary reaction force linearly, and this is realized for instance, by using the devices indicated in FIGS. 19A to 19C. Note that FIGS. 19A and 19C are visualized images; thus, they are drawn slightly different from the other indicated figures.

Brief explanations of FIGS. 19A to 19C are given here. FIG. 19A shows the state of the inner periphery side rotor 11 at the maximum lag angle position (angle of rotation $\theta 0$ of the inner periphery side rotor 11). FIG. 19B shows the state of the inner periphery side rotor 11 after advancing from the maximum lag angle position to the angle of rotation $\theta 1$ in the direction of advance. FIG. 19C shows the state of the inner periphery side rotor 11 having advanced by an angle of rotation $\theta 2$ from the maximum lag angle position to the maximum advance angle position (in the present embodiment, not the state at which the stoppers 47c, ..., 47c exist, but for convenience, this state is taken up as an example).

In the devices shown in FIGS. 19A to 19C, elastic member 386 is installed between the outer periphery side rotor 12 and the inner periphery side rotor 11. The elastic member 386 is provided with a fixed pin 387 by which one of its ends is connected to the outer periphery side rotor 12, and movable pin 385 by which its other end is connected to the inner periphery side rotor 11. The movable pin 385 is retained so as to slide freely in a retention groove 388 in long-hole shape provided in the inner periphery side rotor 11.

In this way, in the devices shown in FIGS. 19A to 19C, when the inner periphery side rotor 11 rotates relatively in the direction of advance from the maximum lag angle position wherein the strong magnetic field state occurs when the unlike poles of the outer peripheral permanent magnets 12A, ..., 12A of the outer periphery side rotor 12 and the inner peripheral permanent magnets 11A, ..., 11A of the inner periphery side rotor 11 face each other as shown in FIG. 19A, the movable pin 385 slides along the retention groove 388 and the biasing force due to the elastic member 386 at this stage almost never acts during the period the inner periphery side rotor 11 is displaced from the angle of rotation $\theta 0$ to the angle of rotation $\theta 1$ with respect to the outer periphery side rotor 12, as shown in FIG. 19B.

Moreover, as shown in FIG. 19B, when the inner periphery side rotor 11 is displaced to the angle of rotation $\theta 1$ corresponding to the outer periphery side rotor 12, the movable pin 385 is positioned at the final end of the retention groove 388, and its sliding is regulated. When the inner periphery side rotor 11 relatively rotates further in the direction of advance, the inner periphery side rotor 11 pulls and deforms the elastic member 386 depending on the angle of rotation, as shown in FIG. 19C. When the elastic member 386 is pulled in this way, the reaction force increases generally proportional to the increase in the angle of rotation, as shown in the characteristics diagram B of FIG. 20. When the relative rotational angle of the inner periphery side rotor 11 becomes $\theta 2$ to reach the maximum advance angle position, a weak magnetic field state occurs as the like poles of the outer peripheral permanent magnets 12A, ..., 12A, and the inner peripheral permanent magnets 11A, ..., 11A face each other.

On the other hand, when the inner periphery side rotor 11 advances in the direction of advance angle from the maximum lag angle position, unlike magnetic poles of the outer peripheral permanent magnets 12A, ..., 12A, of the outer periphery side rotor 12 and the inner peripheral permanent magnets 11A, ..., 11A, of the inner periphery side rotor 11, which were facing each other, gradually become displaced in the direction of rotation. As shown in the characteristics diagram A of FIG. 20, while the inner periphery side rotor 11 advances in the direction of the advance angle to the angle of rotation $\theta 1$, the magnetic reaction force generally increases proportionally, and from the angle of rotation $\theta 1$ to the angle of rotation $\theta 2$, the magnetic reaction force gradually decreases.

In case of the electric motor 1, which uses this device, while the inner periphery side rotor 11 advances from the maximum lag angle position to the angle of rotation $\theta 1$, only the magnetic reaction force due to the outer peripheral permanent magnets 12A, ..., 12A and the inner peripheral permanent magnets 11A, ..., 11A act. During the period it advances from the angle of rotation $\theta 1$ to $\theta 2$, the reaction force of the tensile spring due to the elastic member 386 is added to the magnetic reaction force due to the outer peripheral permanent magnets 12A, ..., 12A and the inner peripheral permanent magnets 11A, ..., 11A. Consequently, the total rotary reaction force which is the sum of the magnetic reaction force and the spring reaction force, increases almost linearly with the increase in the angle of rotation of the inner periphery side rotor 11, as shown in the characteristics C of FIG. 20.

As described above, the rotary reaction force between the two rotors 11, 12 increase almost linearly depending on the relative rotation in the direction of advance angle of the inner periphery side rotor 11 in the electric motor 1. Thus, by controlling the difference in pressure between the advance angle side pressure chamber 56 and the lag angle side pressure chamber 57 such that the rotary reaction forces are in equilibrium, the relative rotational angle of the inner periphery side rotor 11 and the outer periphery side rotor 12 can be arbitrarily controlled. That is, when the spool control pressure of the flow passage switching valve 337 is controlled by the pressure regulating valve 339, the relative rotational angle of the two rotors 11, 12 are controlled to an angle dependent on the spool control pressure.

When the inner periphery side rotor 11 is maintained at the maximum lag angle position in order to operate the electric motor 1 in the strong magnetic field state, the electromagnetic solenoid 372 of the pressure regulating valve 339 is switched off, as shown in FIG. 14, and the control port 374 and the discharge port 377 are connected. As a result, the pressure in the control chamber 359 of the flow passage switching valve 337 is escaped to the outside through the connecting passage 373, and the pressure in the control chamber 359 is maintained at the atmospheric pressure.

At this stage, the advance angle side supply/drainage port 354 is connected to the discharge port 357, the lag angle side supply/drainage port 355 is connected to the second supply port 353, and the pressure of the line passage 333 is supplied to the lag angle side pressure chamber 57 by the flow passage switching valve 337 which displaces the spool 338, as shown in FIG. 15, to the maximum in the direction of the control chamber 359. As a result, the surface on the side of the pressure chamber 56 of the protruding sections 47, . . . , 47 of the housing 33 mechanically touches the blades 36, . . . , 36 of the vane rotor 32 at the maximum lag angle position (position at electrical angle 0°), as shown in FIG. 4, and the inner periphery side rotor 11 is maintained at a strong magnetic field state with respect to the outer periphery side rotor 12.

On the other hand, when the inner periphery side rotor 11 is displaced up to the maximum advance angle position in order to operate the electric motor 1 in the weak magnetic field state, the electromagnetic solenoid 372 of the pressure regulating valve 339 is switched ON, as shown in FIG. 16, and the control port 374 is connected to the line pressure port 375. As a result, the hydraulic fluid of the line passage 333 is supplied into the control chamber 359 of the flow passage switching valve 337 through the connecting passage 373, and the pressure in the control chamber 359 is increased.

At this stage, the flow passage switching valve 337 displaces the spool 338 in a direction opposite to the control chamber 359, as shown in FIG. 17, the advance angle side supply/drainage port 354 is connected to the first supply port 352, and the lag angle side supply/drainage port 355 is connected to the discharge port 357. At this stage, the pressure in the line passage 333 is supplied to the advance angle side pressure chamber 56, and also, the hydraulic fluid of the lag angle side pressure chamber 57 is discharged to the drain passage 336. The result is that the inner periphery side rotor 11 and the housing 33 rotate relatively in the advance angle side with respect to the outer periphery side rotor 12 and the vane rotor 32.

When the inner periphery side rotor 11 is maintained in the weakest magnetic field state, that is, at the maximum advance angle position with respect to the outer periphery side rotor 12, the stoppers 47c, . . . , 47c of the housing 33 and the blades 36, . . . , 36 of the vane rotor 32 are brought into contact and mechanically maintained in the first embodiment mentioned above, as shown in FIG. 2. However, in the present embodiment, rather than bringing into contact the stoppers 47c, . . . , 47c of the housing 33 in the control unit (not shown in the figures) and the blades 36, . . . , 36 of the vane rotor 32 at the mechanical maximum advance angle position, a specific position of a specific angle at the lag angle side (strong field side) is set at the maximum advance angle position (position at an electrical angle below 180°) from control aspects, and the spool control pressure (pressure supplied to the inside of the control chamber 359) is controlled to the pressure for positioning at the maximum advance angle position from the target control perspectives by the electromagnetic solenoid 372 of the pressure regulating valve 339. As a result, when the spool control pressure is controlled, the relative rotating force of the inner periphery side rotor 11 due to the difference in pressures in the advance angle side pressure chamber 56 and the lag angle side pressure chamber 57, and the relative rotation of the inner periphery side rotor 11 at the maximum advance angle position from control perspectives of the angles at which the rotary reaction forces between the two rotors 11, 12 are in equilibrium, are stopped. In view of the above, the control unit (not shown in the figures) restricts the variable width of the relative phase for the vane rotor 32 of the housing 33 by the hydraulic fluid supplied to the pressure chambers 56, 57, and controls it so as to set it within the range of electrical angles below 180°.

When the inner periphery side rotor 11 is to be controlled at another arbitrary position between the maximum lag angle position and the maximum advance angle position, the electromagnetic solenoid 372 of the pressure regulating valve 339 can be used to control the spool control pressure (pressure supplied within the control chamber 359) to a pressure corresponding to the target angle of rotation. As a result, when the spool control pressure is controlled, the relative rotating force of the inner periphery side rotor 11 due to the difference in pressures in the advance angle side pressure chamber 56 and the lag angle side pressure chamber 57, and the relative rotation of the inner periphery side rotor 11 at an angle of rotation at which the rotary reaction forces between the two rotors 11, 12 are in equilibrium, are stopped.

According to the present embodiment described above, the variable width of the relative phase for the housing 33 and the vane rotor 32 is restricted by the hydraulic fluid supplied to the pressure chambers 56, 57. The variable width of the relative phase between the inner periphery side rotor 11 and the outer periphery side rotor 12 is set within the range of electrical angles below 180°, and is also set within the range wherein the stoppers 47c, . . . , 47c of the housing 33 and the blades 36, . . . , 36 of the vane rotor 32 do not touch each other. Therefore, dissonant operating noise due to contact between the stoppers 47c, . . . , 47c and the blades 36, . . . , 36 of the vane rotor 32 does not occur. Consequently, the electric motor is extremely silent.

Also, according to the present embodiment, device is provided to increase the rotary reaction force between the inner periphery side rotor 11 and the outer periphery side rotor 12 almost linearly when the inner periphery side rotor 11 is displaced from the lag angle side to the advance angle side. Consequently, relative rotation stopping controls for housing 33 and vane rotor 32 at the maximum advance angle position can be performed satisfactorily and easily by supply/drainage of hydraulic fluid to the pressure chambers 56, 57 without performing controls for preventing contact between the stoppers 47c, . . . , 47c and blades 36, . . . , 36. The rotary reaction force between the inner periphery side rotor 11 and the outer periphery side rotor 12 may be increased almost linearly when the inner periphery side rotor 11 is displaced from the lag angle side to the advance angle side by controlling the opposing pressure due to supply/drainage of hydraulic fluid to the pressure chambers 56, 57. That is, while supplying the control pressure to control the phase in the first pressure chamber 56, reaction control pressure (equivalent to the biasing force generated in the elastic member 386 mentioned above) that enables the rotary reaction force to be increased almost linearly by matching the magnetic force, is supplied to the second pressure chamber 57.

In the present embodiment, stoppers 47c, . . . , 47c have been provided to mechanically restrict the variable width of the relative phase of the housing 33 and the vane rotor 32 to within 180°, but these stoppers 47c, . . . , 47c can be eliminated.

Moreover, in the present embodiment, the variable width of the relative phase between the housing 33 and the vane rotor 32 which was mechanically determined by the maximum lag angle position of electrical angle 0°, is restricted to the range of electrical angles below 180° determined by supply/drainage control of the hydraulic fluid to the pressure chambers 56, 57, and up to the maximum advance angle position from control perspectives. However, using the same construction, the variable width may be restricted to the range from maximum lag angle position greater than electrical angle of 0° by supply/drainage control of hydraulic fluid to the pressure chambers 56, 57 to the maximum advance angle position of electrical angles below 180° (for instance, electrical angles of 10° to 170°). That is, rather than setting the mechanical maximum lag angle position (position of electrical angle of 0) at which the surface on the side of pressure chamber 56 of protruding sections 47, . . . , 47 of the housing 33 and the blades 36, . . . , 36 of the vane rotor 32 come in contact, a specific position of a specific angle on the advance angle side (weak field side) is set as the maximum lag angle position from control perspectives. Also, similar to the above, rather than setting the mechanical maximum advance angle position at which the stoppers 47c, . . . , 47c of the housing 33 and the blades 36, . . . , 36 of the vane rotor 32 come in contact with each other, a specific position of a specific angle on the lag angle side (strong field side) is set as the maximum advance angle position (position at electrical angle below 180°) from control perspectives, and relative rotation of the vane rotor 32 and housing 33 is performed between the maximum lag angle position and the maximum advance angle position from these control perspectives.

In this case also, if the strong field position at which the unlike poles of the outer peripheral permanent magnets 12A, . . . , 12A and the inner peripheral permanent magnets 11A, . . . , 11A of the outer periphery side rotor 12 and the inner periphery side rotor 11, face each other to create the force of attraction as shown in FIG. 4, is set as the home position, then from control perspectives, the maximum lag angle position that supplies the initial fluid pressure to the first pressure chamber 56 from this home position is taken as the start position for phase change. In this way, in either the maximum lag angle position or the maximum advance angle position, the housing 33 and the vane rotor 32 do not come in contact with each other; moreover, the motor becomes extremely silent, and operation with no overshoot can be performed speedily.

By eliminating the stoppers 47c, . . . , 47c, the mechanical variable width of the relative phase between the housing 33 and the vane rotor 32 may be set within the range of electrical angles of 180° (greater than 0° but less than 180°), and the controllable variable width may be set at electrical angles below 180° (for instance greater than 0° and less than 180°).

Furthermore, the mechanical variable width of the relative phase between the housing 33 and the vane rotor 32 may be set at electrical angles above 180° (for instance, 200°: greater than −10°, less than 190°), and the controllable variable width may be set at electrical angles below 180° (for instance, greater than 0° but less than 180°).

Fifth Embodiment

Figure 21:
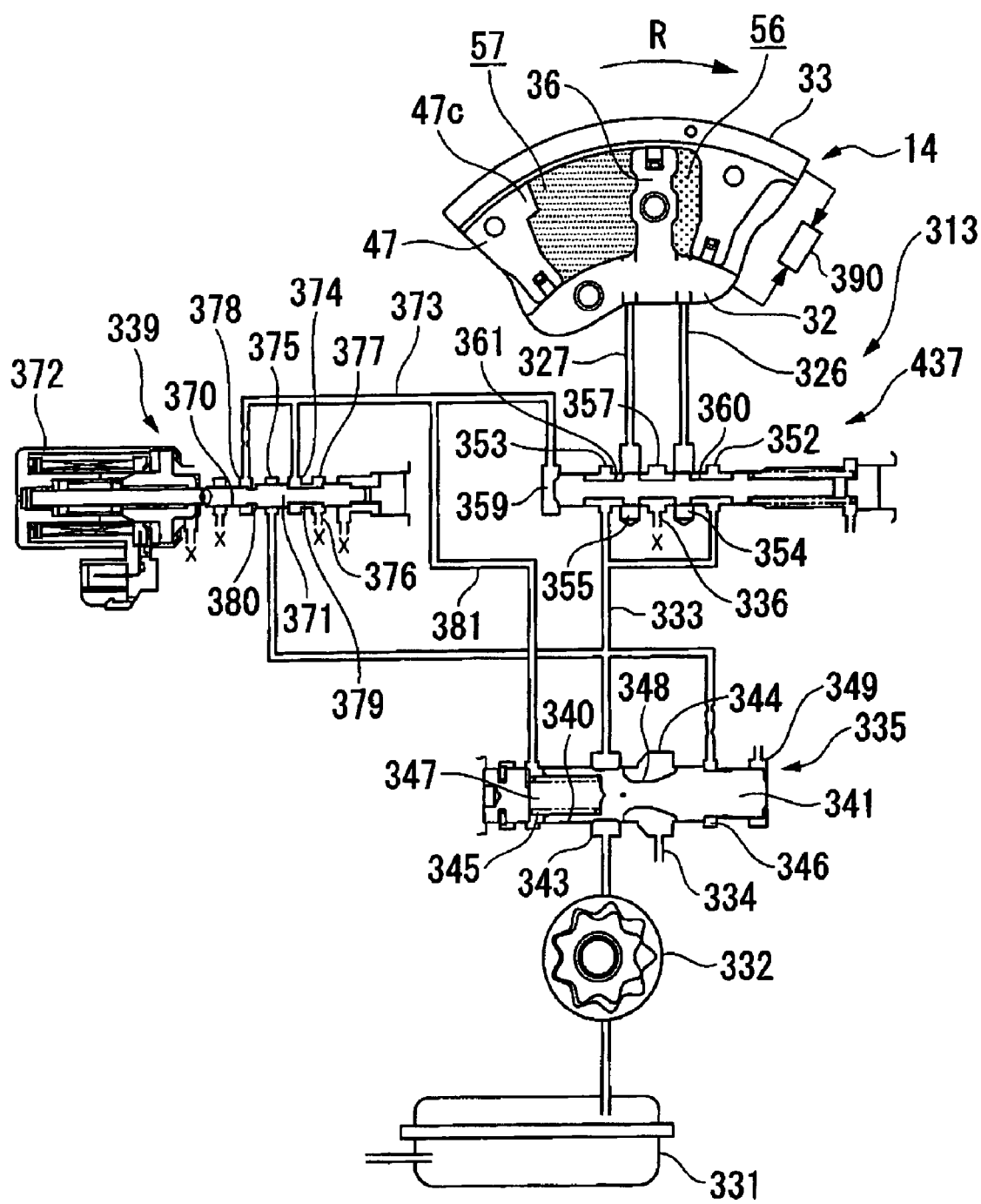
FIG. 21 is a hydraulic circuit diagram with the focus on a hydraulic control device in an electric motor of a fifth embodiment of the present invention.

In the fourth embodiment described above, the advance angle side feedback chamber 362 and the lag angle side feedback chamber 363 are provided in the flow passage switching valve 337, the rotary reaction force of the outer periphery side rotor 12 and the inner periphery side rotor 11 is varied almost linearly, and the difference in pressures of the advance angle side pressure chamber 56 and the lag angle side pressure chamber 57 controlled by the pressure regulating valve 339, is balanced by the rotary reaction force between the two rotors 11, 12 such that inner periphery side rotor 11 can be controlled at an arbitrary relative position. However, as shown in the flow passage switching valve 437 of the fifth embodiment in FIG. 21, the advance angle side feedback chamber and the lag angle side feedback chamber may be eliminated. Instead, a sensor 390 for detecting the relative rotating position of the vane rotor 32 (outer periphery side rotor 12) and the housing 33 (inner periphery side rotor 11) may be installed, and taking the relative rotating position detected by this sensor 390 as the basis, the electromagnetic solenoid 372 of the pressure regulating valve 339 may be used for feedback control. In FIG. 21, parts that are the same as the parts in the fourth embodiment above, are affixed with the same notations.

In the present embodiment also, the variable width of the relative phase for the vane rotor 32 of the housing 33 is restricted by the hydraulic fluid supplied to the pressure chambers 56, 57, and the variable width of the relative phase between the inner periphery side rotor 11 and the outer periphery side rotor 12 is set in the range of electrical angles below 180°.

Here, both the fourth embodiment and the fifth embodiment are applicable to the second embodiment, and are also applicable to the third embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCE NUMERALS

10 electric motor; 11 inner periphery side rotor; 11a inner peripheral permanent magnet; 11A inner peripheral permanent magnet; 12 outer periphery side rotor; 12a outer peripheral permanent magnet; 12A outer peripheral permanent magnet; 14, 70, 105 rotating mechanism (rotating device); 16, 72, 114 output shaft (rotating shaft); 31 drive plate (end plate); 32 vane rotor (first member); 33 housing (second member); 36 blade; 47 protruding section; 47c stopper; 48 groove; 56, 101, 116 first pressure chamber (pressure chamber); 57, 102, 117 second pressure chamber (pressure chamber); 65 output shaft (rotating shaft); 71 drive plate (first member); 74 supporting member (first member, drive plate); 78 ring gear (second member); 81 cylinder (rotating shaft);

81*a*, 91*a*, 94*a*, 95*a* helical spline; 82 spline (first member, drive plate); 107 housing (first member); 107*c*, 107*d* hole; 108 piston (second member); 120*a*, 102*b* wall face.

What is claimed is:

1. An electric motor comprising:
   an inner periphery side rotor provided with inner peripheral permanent magnets with unlike poles, which are disposed alternately along a circumferential direction of the inner periphery side rotor;
   an outer periphery side rotor provided with outer peripheral permanent magnets with unlike poles, which are disposed alternately along a circumferential direction of the outer periphery side rotor, the outer periphery side rotor being arranged such that a rotational axis thereof is coaxial with a rotational axis of the inner periphery side rotor; and
   a rotating device that varies a relative phase between the inner periphery side rotor and the outer periphery side rotor by rotating at least the inner periphery side rotor or the outer periphery side rotor around the rotational axis, and sets a variable width of the relative phase between the inner periphery side rotor and the outer periphery side rotor within a range of an electrical angle of below 180°,
   wherein the rotating device comprises a pressure chamber on the inside of the inner side rotor and varies the relative phase between the inner periphery side rotor and the outer periphery side rotor by supplying a hydraulic fluid to the pressure chamber.

2. The electric motor according to claim 1, wherein the rotating device:
   comprises a first member integrally and rotatably provided to the outer periphery side rotor, and a second member integrally and rotatably provided to the inner periphery side rotor which together with the first member defines the pressure chamber on the inside of the inner periphery side rotor.

3. The electric motor according to claim 2, wherein the variable width of the relative phase between the inner periphery side rotor and the outer periphery side rotor is set within a range of an electrical angle of below 180° by mechanically restricting the variable width of the relative phase of the second member in relation to the first member.

4. The electric motor according to claim 2, wherein the variable width of the relative phase between the inner periphery side rotor and the outer periphery side rotor is set within a range of an electrical angle of below 180° by restricting the variable width of the relative phase of the second member in relation to the first member with a hydraulic fluid supplied to the pressure chamber.

5. The electric motor according to claim 2, wherein:
   the first member is a vane rotor disposed on the inside of the inner periphery side rotor, and is integrally provided to the outer periphery side rotor; and
   the second member is a housing with a groove which together with the vane rotor, defines the pressure chamber and is integrally installed on the inside of the inner periphery side rotor while rotatably housing blades of the vane rotor.

6. The electric motor according to claim 2, wherein:
   the first member is a drive plate integrally provided to a rotating shaft and the outer periphery side rotor so as to cover two end faces of the inner periphery side rotor and the outer periphery side rotor, which transmits a rotating force to the rotating shaft; and
   the second member is a ring gear disposed between the inner periphery side rotor and the rotating shaft, and is connected to the inner periphery side rotor and the rotating shaft by helical salines, which together with the drive plate, defines the pressure chamber, and which moves in the axial direction to supply a hydraulic oil to the pressure chamber.

7. The electric motor according to claim 2, wherein:
   the first member is a housing integrally provided to the outer periphery side rotor and a rotating shaft that transmits the drive force of the outer periphery side rotor; and
   the second member is a piston inserted in a hole formed in the housing, which together with the hole, defines the pressure chamber, and is in contact with a wall face of the inner periphery side rotor.

8. The electric motor according to claim 1, wherein the rotating device sets the positions at which the unlike poles of the outer peripheral permanent magnet and the inner peripheral permanent magnet facing each other at the home positions of the outer periphery side rotor and the inner periphery side rotor, and varies the relative phase between the inner periphery side rotor and the outer periphery side rotor from the home positions in the range of electrical angles of below 180°.

9. The electric motor according to claim 8, wherein the position at which the fluid pressure is initially supplied to the pressure chamber of the rotating device is taken as a start position for phase change from the home position.

* * * * *